(12) United States Patent
Minano et al.

(10) Patent No.: US 10,459,126 B2
(45) Date of Patent: Oct. 29, 2019

(54) VISUAL DISPLAY WITH TIME MULTIPLEXING

(71) Applicant: TESSELAND LLC, Glendale, CA (US)

(72) Inventors: Juan Carlos Minano, Madrid (ES); Pablo Benitez, Madrid (ES)

(73) Assignee: Tesseland LLC, Glendale, CA (US)

( * ) Notice: Subject to any disclaimer, the term of this patent is extended or adjusted under 35 U.S.C. 154(b) by 53 days.

(21) Appl. No.: 15/545,620

(22) PCT Filed: Jan. 20, 2016

(86) PCT No.: PCT/US2016/014151
§ 371 (c)(1),
(2) Date: Jul. 21, 2017

(87) PCT Pub. No.: WO2016/118640
PCT Pub. Date: Jul. 28, 2016

(65) Prior Publication Data
US 2018/0003999 A1 Jan. 4, 2018

Related U.S. Application Data

(60) Provisional application No. 62/208,235, filed on Aug. 21, 2015, provisional application No. 62/105,905, filed on Jan. 21, 2015.

(51) Int. Cl.
*H04N 13/344* (2018.01)
*G02B 3/00* (2006.01)
(Continued)

(52) U.S. Cl.
CPC .......... *G02B 3/0037* (2013.01); *G02B 27/01* (2013.01); *G02B 27/0172* (2013.01);
(Continued)

(58) Field of Classification Search
CPC .............. G02B 3/0037; G02B 27/0172; G02B 27/2264; G02B 27/017; H04N 13/344;
(Continued)

(56) References Cited

U.S. PATENT DOCUMENTS

2002/0015233 A1   2/2002  Park
2004/0070855 A1   4/2004  Benitez et al.
(Continued)

FOREIGN PATENT DOCUMENTS

KR    10-2002-0010966 A    2/2002

OTHER PUBLICATIONS

Cheng et al.: "Large field-of-view and high resolution free-form head-mounted display" Proceedings of SPIE, vol. 7652, p. 76520D (Jul. 1, 2010).
(Continued)

*Primary Examiner* — John R Schnurr
(74) *Attorney, Agent, or Firm* — Drinker Biddle & Reath LLP

(57) ABSTRACT

A given image is displayed by generating a succession of partial real images, each representing part of the given image and together representing the given image, and at least some of the partial real images occupying overlapping positions. The partial real images are successively imaged to form a sub-image viewable from an eye position. The sub-images combine spatially and temporally to form a virtual image viewable from the eye position so that said overlapping portions of different partial real images form different portions of the virtual image. The partial real images may be displayed on a digital or other display, and imaged by optical channels each using one or more lenslets.

28 Claims, 14 Drawing Sheets

(51) Int. Cl.
*G02B 27/22* (2018.01)
*H04N 13/341* (2018.01)
*G02B 27/01* (2006.01)
*G06T 15/00* (2011.01)
*H04N 13/383* (2018.01)
*G02B 27/00* (2006.01)
*G06T 19/00* (2011.01)

(52) U.S. Cl.
CPC ......... *G02B 27/2264* (2013.01); *G06T 15/00* (2013.01); *H04N 13/341* (2018.05); *H04N 13/344* (2018.05); *G02B 27/0093* (2013.01); *G02B 2027/0123* (2013.01); *G02B 2027/0134* (2013.01); *G06T 19/006* (2013.01); *H04N 13/383* (2018.05)

(58) Field of Classification Search
CPC ... H04N 13/341; H04N 13/332; H04N 13/339
See application file for complete search history.

(56) References Cited

U.S. PATENT DOCUMENTS

| 2004/0108971 | A1 | 6/2004 | Waldern et al. |
| 2007/0024968 | A1 | 2/2007 | Kim et al. |
| 2008/0049152 | A1 | 2/2008 | Hong et al. |
| 2013/0187836 | A1* | 7/2013 | Cheng ................ G02B 27/0172 345/8 |
| 2014/0176528 | A1* | 6/2014 | Robbins ............... G02B 27/225 345/419 |

OTHER PUBLICATIONS

Extended European Search Report dated Sep. 20, 2018 (corresponding EP Appl. No. 16740685.9).
International Search Report of PCT/US2016/014151, dated May 23, 2016 (dated May 23, 2016).
Written Opinion of the International Searching Authority of PCT/US2016/014151, dated May 23, 2016 (dated May 23, 2016).

* cited by examiner

VISUAL DISPLAY WITH TIME MULTIPLEXING

CROSS REFERENCE TO RELATED APPLICATIONS

This application claims benefit of commonly invented and assigned U.S. Provisional Patent Applications No. 62/105,905, filed on 21 Jan. 2015, and No. 62/208,235 filed on 21 Aug. 2015, both for "Immersive Compact Display Glasses." Both of those applications are incorporated herein by reference in their entirety. This application is related to commonly invented and assigned International Patent Application No. WO 2015/077718, published 28 May 2015, for "Immersive compact display glasses," which is incorporated herein by reference in its entirety.

FIELD OF THE INVENTION

The application relates to visual displays, and especially to head-mounted display technology.

BACKGROUND

1. References Cited

WO 2015/077718, published 28 May 2015, which is commonly invented and assigned PCT/US 2014/067149 for "Immersive compact display glasses," referred to below as "PCT1".

A. Brückner et al., *Thin wafer-level camera lenses inspired by insect compound eyes*, Opt. Exp. Vol. 18, no. 14 (2010) ("Brückner 2010").

A. Brückner, "*Microoptical Multi Aperture Imaging System*" Ph.D. Thesis dissertation Friedrich Schiller University, Jena, Germany, 2011 http://www.db-thueringen.de/servlets/DerivateServlet/Derivate-24992/br%C3%BCckner/dissertation_a_brueckner_Multi_Aperture_Imaging_Systems_2011_12_22.pdf ("Brükner 2011")

D. Cheng et al., Design of a wide-angle, lightweight head-mounted display using free form optics tiling, Opt. Lett. 36, 2098-2100 (2011) ("Cheng 2011").

C. Chinnock, *Why Counting RGB sub pixels isn't the Best Way to Measure Resolution*, Insight Media Display Intelligence (3 Morgan Ave. Norwalk, Conn. 06581 USA), Nov. 13, 2015. http://www.insightmedia.info/insight-media-releases-new-white-paper-on-sub-pixel-rendering-and-resolution/("Chinnock 2015")

J. Duparré and R. Völkel, *Novel Optics/Micro Optics for Miniature Imaging Systems*, Proc. SPIE 6196, Photonics in Multimedia, 619607 (Apr. 21, 2006); doi:10.1117/12.662757 ("Duparré 2006").

D. Fattal, Z. Peng, T. Tran, S. Vo, M. Fiorentino, J. Brug, and R. G. Beausoleil, "*A multi-directional backlight for a wide-angle, glasses-free three-dimensional display,*" Nature, vol. 495, 7441, pp 348-351, 2013. DOI: 10.1038/nature11972 ("Fattal 2013")

F. Heide, D. Lanman, D. Reddy, J. Kautz, K. Pulli, D. Luebke, *Cascaded Displays: Spatiotemporal Superresolution using Offset Pixel Layers* doi:10.1145/2601097.2601120 ("Heide 2014")

F. Huang, K. Chen, G. Wetzstein. "*The Light Field Stereoscope: Immersive Computer Graphics via Factored Near-Eye Light Field Displays with Focus Cues*", ACM SIGGRAPH (Transactions on Graphics 33, 5), 2015 ("Huang 2015")

S. Liu and H. Hua, "*Time-multiplexed dual-focal plane head-mounted display with a liquid lens,*" Opt. Lett. 34, 1642-1644 (2009) ("Liu 2009").

P. Llull, N. Bedard,W. Wu, I. Točié, K. Berkner, and N. Balram *Design and optimization of a near-eye multifocal display system for augmented reality* doi: 10.1364/AOMS.2015.JTH3A.5 ("Llull 2015)

A. Maimone, R. Chen, H. Fuchs, R. Raskar, G. Wetzstein. "*Wide Field of View Compressive Light Field Display using a Multilayer Architecture and Tracked Viewers*", Journal of the Society for Information Display, 2015 ("Maimone 2015")

J. E. Melzer, *Overcoming the Field of View: Resolution Invariant in Head Mounted Displays*, SPIE Vol. 3362, 1998 ("Meltzer 1998")

John R. Moore; Neil A. Dodgson; Adrian R. L. Travis and Stewart R. Lang, *Time-multiplexed color autostereoscopic display*, Proc. SPIE 2653, Stereoscopic Displays and Virtual Reality Systems III, 10 (Apr. 10, 1996); doi:10.1117/12.237418) ("Moore 1996").

A Shilov, "*Toshiba Develops High-Speed, High-Contrast Active Shutter 3D Glasses*", http://www.xbitlabs.com/news/monitors/display/20100519223434_Toshiba_Develops_High_Speed_High_Contrast_Active_Shutter_3D_Glasses.html, May 5, 2010, ("Shilov 2010")

G. Wetzstein, D. Lanman, M. Hirsch, R. Raskar, *Tensor displays: compressive light field synthesis using multilayer displays with directional backlighting*, Siggraph 2012. DOI: 10.1145/2185520.2185576 ("Wetzstein 2012")

R. Winston, J. C. Miñano, and P. Benitez, *Nonimaging optics*, New York: Elsevier-Academic Press, 2005 ("Winston 2005")

2. Definitions

| | |
|---|---|
| channel | Set of lenslets that are open during the same sub-frame slot. When shutters are used, the lenslets of the same channel may share the same shutter or may have synchronous shutters. A channel may consist of a single lenslet that images a partial image on the display into a sub-image on the virtual screen. A channel may comprise two or more lenslets that simultaneously image non-overlapping partial real images on the display into sub-images on the virtual screen, and the partial real images may then be arranged so that they would not form parts of an uninterrupted image on the display. A channel may comprise two or more lenslets that simultaneously image overlapping portions of one partial real image on the display into overlapping portions of a sub-image on the virtual screen. |
| cluster | Set of opixels that illuminates the pupil range through a given lenslet. Opixels belonging to the same cluster are adjacent one to another; the clusters are topologically connected sets. The number of clusters is equal to the number of lenslets. In time multiplexing, clusters of different sub-frame slots may intersect. |
| digital display | Component (typically electronic) that modulates the light, which can be self-emitting (e.g. an OLED display) or externally illuminated by a front or a backlight system (e.g. an LCD or an LCOS). The modulation is typically both temporal (image may change with time) and spatial (image may change with the position on the digital display). Some special digital displays produce angular modulation in addition to temporal and spatial modulation. These special displays are called Light Field Displays. |
| eye pupil | Image of the interior iris edge of the eye through the eye cornea seen from the exterior of the eye. In visual optics, it is referenced to as the input pupil of the optical system of the eye. Its boundary is typically |

| | |
|---|---|
| | a circle from 3 to 7 mm diameter depending on the illumination level. |
| eye sphere | Sphere centered at the approximate center of rotation of the eye and with radius equal to the average distance of the eye pupil to that center (typically 13 mm). For practical reasons in designing the apparatus, the eye, and other parts of the viewer, are represented by typical dimensions of an adult human being at an intended position relative to the apparatus. |
| field of view | Region within the horizontal and vertical full angles subtended by the virtual screen from the eye pupil center when the two eyes rest looking frontwards. Abbreviated FoV. |
| frame time | Period of time during which a complete set of sub-frames forming an image is shown once. Also called frame display time. |
| guard | Corridor between adjacent clusters of the digital display that does not contain active opixels. The guard avoids optical cross-talk while guaranteeing a certain tolerance for the optics positioning. |
| human angular resolution | Minimum angle subtended by two point sources which are distinguishable by an average perfect-vision human eye. The angular resolution is a function of the peripheral angle and of the illumination level. |
| ipixel | Virtual image of the opixels belonging to the same web. Preferably, this virtual image is formed at a certain distance from the eye (from 2 m to infinity). It can also be considered as a pixel of the virtual screen seen by the eye. When using a Light Field Display as digital display, the ipixels will not generally be at a fixed distance from the eye, and that distance may vary from frame to frame. |
| lenslet | Each one of the individual optical devices of the optics array, which collects light from the digital display and projects it to the eye sphere. Each lenslet may be formed by one or more optical surfaces. There is one lenslet per cluster. The lenslet is designed to form a continuous image of its cluster's opixels into ipixels. In time multiplexing and when shutters are used, there is usually one shutter per lenslet. |
| open cluster | In time multiplexing, cluster which is imaged on the virtual screen during a sub-frame slot through an open channel. When shutters are used, the open clusters are those whose shutter is open. The lenslet of an open cluster is an open lenslet. When there is no time multiplexing any cluster is an open cluster. The intersection of any two open clusters of the same sub-frame slot is the empty set and the union of all open clusters of the same sub-frame slot plus the inactive area is the whole digital display. |
| open lenslet | In time multiplexing, lenslet belonging to an open channel. When shutters are used, an open lenslet is a lenslet whose shutter is open. When there is no time multiplexing any lenslet is an open lenslet. |
| opixel | Physical pixel of the digital display. There are active opixels, which are lit to contribute to the displayed image, and inactive opixels, which are never lit. When an active opixel is lit, a substantial fraction its lit rays impinge on the eye sphere inside the pupil range of its cluster's lenslets. If an inactive opixel were lit, its light rays would impinge on the eye sphere outside the pupil range. An inactive opixel can be physically nonexistent, for instance, because the display lacks at that opixel position at least one necessary hardware element (OLED material, electrical connection) to make it functional, or it can be unaddressed by software. The use of inactive opixels reduces the power consumption and the amount of information to be managed. Every active opixel belongs to a single open cluster and to a single web during a sub-frame slot. |
| optical cross-talk | Undesired situation in which one opixel is imaged into more than one ipixel. |
| pupil range | Region of the eye sphere illuminated by a single cluster through its corresponding lenslet. When the eye pupil intersects the pupil range of a given lenslet, then the image corresponding to its corresponding cluster is projected on the retina. For a practical immersive design, a pupil range comprising a circle of 15 degrees |
| | full angle on the eye sphere is sufficient. The boundary of the union of all accessible eye pupil positions for an average human is approximately an ellipse with angular horizontal semi-axis of 60 degs and vertical semi-axis of 45 degs relative to the front direction. |
| sub-frame slot | One of a succession of time slots into which the frame period is divided. Sub-frame slots are called by an ordinal, i.e. first sub-frame slot, second, etc. Any cluster (or lenslet) is an open cluster (or open lenslet) during one sub-frame slot at least. |
| sub-image | An image to be shown on the virtual screen during a frame is split in several parts called sub-image. Each of these sub-images is imaged through a single channel and it is shown during one or more sub-frame slots. |
| time multiplexing | An image to be shown on the virtual screen during a frame is split into several parts called sub-images. These parts are shown in a time-division multiplexing (TDM) scheme, i.e., each part is shown during sub-frame slot of the frame period. At the end of the frame, all the image parts have been shown at least during one sub-frame slot. |
| virtual screen | Surface, usually imaginary, containing the ipixels, preferably being a region of the surface of a sphere concentric with the eye and with radius in the range from 2 m to infinity. When Light Field Displays are used the virtual screen is no longer a spherical static surface but the locus of the points where the rays of ipixels converge. |
| web | Set of active opixels displaying information of the same ipixel during the same sub-frame slot. During a sub-frame slot, there is a one-to-one correspondence between webs and ipixels seen through the open lenslets. The lenslets design aims to image all the opixels of every web into its corresponding ipixel. The intersection of any two webs of the same sub-frame slot is the empty set and the union of all webs plus the inactive area is the whole digital display. This implies that every active opixel is to be imaged onto a single ipixel. |

4. State of the Art 4.1 Head Mounted Displays

Head Mounted Display (HMD) technology is a rapidly developing area. One aspect of head mounted display technology provides a full immersive visual environment (which can be described as virtual reality), such that the user only observes the images provided by one or more displays, while the outside environment is visually blocked. These devices have application in areas such as entertainment, gaming, military, medicine and industry. In US 2010/0277575 A1 of Ismael et al. there is a description of one example of such a device. The basic optical function of a HMD is that of a stereoviewer such as the one described in U.S. Pat. No. 5,390,047 to Mizukawa.

A head mounted display consists typically of one or two displays, their corresponding optical systems, which image the displays into a virtual screen to be visualized by the user's eye, and a helmet that visually blocks the external environment and provides structural support to the mentioned components. The display may also have a pupil tracker and/or a head tracker, such that the image provided by the display changes according to the user's movement.

An ideal head mounted display combines a high resolution, a large field of view, a low and well-distributed weight, and a structure with small dimensions. Although some technologies successfully achieve these desired features individually, so far no known technology has been able to combine all of them. That results in an incomplete Or even uncomfortable experience for the user. Problems may include a low degree of realism and eye strain (low resolution or optics imaging quality), failure to create an immersive environment (small field of view), or excessive pressure on the user's head (excessive weight).

One approach used to increase the field of view while maintaining the resolution is tiling, i.e., using multiple displays per eye arranged in a mosaic pattern, and not in the same plane. That approach is presented in the reference Melzer 1998 or Cheng 2011. The patent U.S. Pat. No. 6,529,331 B2 to Massof also presents this solution.

Lenslet arrays have found considerable applications in virtual machine sensors, in the field of multi-aperture cameras. They have capacity of increasing the field of view of the overall system while using a small focal length, which provides compactness. There are two major approaches to lenslet array based sensors inspired by insect eyes: (1) apposition systems and (2) superposition systems. The superposition systems use several neighboring lenses to illuminate a single sensor area, forming a single real image of the environment. In apposition systems there is no single real image formation on a surface.

There are several subtypes of apposition multi-aperture camera systems, the best known being the ones using only one pixel per lenslet, while in the present disclosure there is a multiplicity of pixels per lenslet. An example of this apposition lenslet array system can be found in Brückner 2011, page 28. Another example is found in Duparré 2006, in which also single sided toroidal lenslets for correcting the astigmatism are disclosed.

A second type of apposition multi-aperture camera system uses optical stitching, where each lenslet transfers its related part of the FoV and where adjacent partial images are optically stitched together in a way that the image details at the intersections between adjacent partial images are preserved. An example can be found in the Optical Cluster Eye in Brückner 2011, page 75. In Brückner's system, each lenslet captures a non-overlapping part of the Field of View (FoV). This contrasts with the devices disclosed in PCT1, where the FoV captured by each lenslet overlaps with others, and does not require masks to avoid crosstalk. Brückner uses the word "optical channel" instead of lenslet. We have modified it here to be consistent.

A third type of apposition multi-aperture camera system uses electronic stitching of segments. In Brückner 2010, a system using a multi-lenslet approach is used such that in each lenslet, only part of the whole FoV is recorded and a final image is created by stitching all the partial images by means of software processing. In multi-aperture cameras with electronic stitching, the pitch of the lenslets is always greater than the pitch of their illuminated sectors in the sensor to widen its field of view and minimize the sensor area. This implies that the input pupil of the camera is virtual, located behind the sensor, and its position and shape are not relevant and are not taken into account in the design.

Another prior art approach to multi-aperture cameras is given in the same reference Brückner 2010, page 24384 (and also in Brückner 2011, page 38) where it is referred to as "increased sampling". As presented in FIG. 2 of PCT1, the partial images of each adjacent pair of lenslets are "braided" to enable a higher resolution for a lower focal length, and focused into the sensor through sectors of pixels. The braiding described by Brückner eliminates completely the redundancy in the sensor-to-field mapping, that is, there is a bijective (i.e., point to point) mapping between the pixels in the sensors (called opixels herein) and image of these opixels, i.e., the pixels in the field (called ipixels herein).

PCT1 teaches how to design apposition type optics for a Head Mounted Display. FIG. 1 (this is FIG. 3 of PCT1) shows a simple example with only four clusters 0104*t*, 0104*b*, 0105*t* and 0105*b*, which form the compound image created by opixels on the digital display 0107. Those opixels are projected by the lenslet array optics to form the image of ipixels on the virtual screen 0108 (which for simplicity has been drawn here flat with a rectangular contour). Every opixel belongs to a single cluster (the intersection of any two clusters is the empty set and the union of all clusters is the whole digital display).

Each cluster displays a portion of the image on the virtual screen. Adjacent clusters display portions of the image with a certain shift. Some parts of the image appear in more than one cluster. In order to explain why this is necessary, a two-dimensional schematic drawing has been added at the top of FIG. 1. It shows the relevant rays to define the edges of the mapping between opixels and ipixels. In this drawing, the virtual screen with the ipixels is placed at infinity, so the direction of rays 0100*a*, 0101*a*, 0102*a* and 0103*a* indicates the ipixel positions on the virtual screen. The drawing is two-dimensional for simplicity, but the actual device that projects the image on the bottom left in FIG. 1 is three-dimensional and contains four lenslets, two above and two below, and not only the two shown as 0104 and 0105 in the schematic drawing at the top of FIG. 1. The two-dimensional scheme is used to explain the horizontal coordinates of the mapping between opixels and ipixels, and an analogous reasoning applies to the vertical coordinates.

The horizontal extent of the virtual screen extends from 0100*a* to 0103*a*. The portion of the image represented in the left clusters 0104*t* and 0104*b* is given by the edge rays 0100*a* and 0102*a* reaching the edges of the pupil range 0106, which define the vertical lines 0100*a* and 0102*a* on the virtual screen 0108. Analogously, the portion of the image of represented in the right clusters 0105*t* and 0105*b* is given by the edge rays 0101*a* and 0103*a*, which define two vertical lines on the virtual screen 0108. Therefore, the portion of the virtual screen 0108 between 0101*a* and 0102*a* will be displayed in both left and right clusters. Specifically, lenslet 0104 maps edge rays 0100*a* and 0102*a* of the virtual screen onto 0100*b* and 0102*b* on the digital display 0107. Analogously, lenslet 0105 maps edge rays 0101*a* and 0103*a* onto 0101*b* and 0103*b* on the digital display 0107. The optical design has to guarantee that the clusters do not overlap, which is achieved with maximum use of the digital display when 0101*b* and 0102*b* coincide. The analogous alignment of top clusters 0104*t*, 0105*t* with bottom clusters 0104*b*, 0105*b*, is apparent from FIG. 1.

Because of the partial coincidence of the information on the clusters, ipixel ip1 is formed by the projection of four opixels, op11, op12, op13 and op14. This set of opixels is referred to as the "web" of ipixel ip1. Webs of ipixels located in the center of the virtual screen, such as ip1, contain four opixels each. However, webs of ipixels close to the boundaries of the virtual screen may have fewer opixels. For instance, the web of ipixel ip2 contains only two opixels, op21 and op22, and the web of ip3 contains only op31.

4.2 Time Multiplexing

An old approach used to increase resolution in visual displays is based on the time-division multiplexing (TDM) scheme. It relies on the relatively long persistence of the images on the human retina compared with fast change of the images generated in electro-optical displays. This is also the basis of the old Cathode Ray Tube (CRT) where the combined persistence of the phosphor of the screen and that of our retina creates the illusion of a steady image from a single scanning point (only one point is being drawn at a time) when the cathode beam is raster scanned on the screen of the CRT.

TDM allows forming the image of a frame on the retina not all at once, but sequentially, provided the time used to create the full image on the retina is not greater than the persistence time. An image to be shown on the virtual screen during a frame is split in several parts called sub-images. Each of these parts is shown during a portion of the time frame called a sub-frame slot. At the end of the time frame, all the image parts have been shown during one sub-frame slot at least.

When a time multiplexing technique is used, one part of a frame image is displayed in a sub-frame slot using the complete set of opixels for creating only this part of the full image. The remaining parts of the image are generated in later sub-frame slots while the former parts of the image still persist in the retina. Then, the resolution of the image (total number of ipixels) can be greater than the resolution of the display (total number of opixels).

The TDM technique has been applied to many types of digital display. Chinnock 2015 describes a number of schemes for improving the effective resolution by exploiting the internal structure of each pixel in the display panel to generate two or more sub-pixels within each pixel. The higher-resolution image is then divided into two or more interlaced sub-images, with each display pixel contributing one sub-pixel to each sub-image. For instance, as illustrated in FIG. 2, Panasonic was able to create a 10K pixel image on a 2.5K pixel display, by dividing the 10 K pixel image into four 2.5K pixel sub-images (see 0201, 0202, 0203 and 0204 in FIG. 2, where each one of the non-black squares represents 1 active sub-image pixel) which are sequentially displayed with each sub-image shifted slightly in space so the displayed sub-images are interlaced or "braided" as in the case of Brückner's "increased sampling". The projector runs at 240 sub-frames per second (fps). Since each one of these sub-frames corresponds to one of the 4 sub-images, the composite image is being refreshed at 60 fps. The shifting, done with an optical element, fills in the checkerboard to complete the image.

Time multiplexing is also used in automultiscopic displays, see Wetzstein 2012, based on multilayer panels working at a high refresh rate and illuminated with a fast-switching directional backlighting (i.e., a low-resolution light field emitter). In this case an image pixel cannot be defined by all the rays emerging from a small region of an image plane but by a thin pencil of rays occupying a certain phase space region (i.e., with spatial and angular definition). TDM is used to generate ray pencils in different directions from the same part of the physical display.

WO 2009156752 A1 by Lacoste et al. discloses a holographic display for a HUD using time multiplexing. In some of the configurations disclosed by Lacoste the images are monochrome, so the full color is achieved by time multiplexing images of different colors. The images displayed during a sub-frame slot in the configurations disclosed by Lacoste are always complete, i.e., they fill the virtual screen. This time multiplexing of monochrome images is sometimes known as color sequential. Color sequential has also been implemented, for instance, using a liquid crystal color shutter, see Moore 1996.

Liu 2009 applied time multiplexing to near-eye display systems to image up to 2 focal planes. The images displayed in each sub-frame slot occupy the full virtual screen. Some years later, Llull 2015 implemented a similar concept for 6 focal planes. Liu 2009 and Llull 2015 use time multiplexing to solve mismatched ocular convergence and accommodation cues in conventional stereoscopic displays. Liu 2009 and Llull 2015 achieve their goal by displaying several consecutives images (all of them occupying the full virtual screen) with different focal planes using a high speed focal modulator (made of a liquid lens whose focal length can be changed fast). These different images are displayed during each frame time. WO 2009/156752 A1 by Lacoste et al. also discloses configurations where different plane images are time-multiplexed, although in Lacoste by using holograms.

SUMMARY

In one aspect of the present application, display glasses use a single digital display per eye. The image is shown as a succession of sub-images, each sub-image being shown during a fraction of the frame time called a sub-frame slot. The union of all sub-frame slots is the frame display time and the union of all sub-images forms the full image shown on the virtual screen. The sub-images may overlap in space, unlike sub-frame slots which have no intersection in time. The optics collecting the light from the digital display is divided in different channels; each channel typically corresponds to a single sub-frame slot and a single sub-image. The term "channel" is taken from Signal Theory where it is used for the different segments in time multiplexing. Every optical channel images the same object, which is the digital display, but with a different image region since the sub-images are not coincident. This requirement implies, in general, asymmetric configurations for each optical channel; and since these asymmetries benefit from free-form optical designs (i.e., designs that have neither rotational nor translational symmetry), the optical devices described in the present application are free-form. A single channel may comprise more than one lenslet. Consequently the mapping between opixels and ipixels generated by the channel may be discontinuous, unlike the mapping established by a single lenslet that is continuous in its domain of application.

In another aspect, a display device comprises a display, operable to generate a real image, and an optical system, comprising a plurality of optical channels, each of the optical channels comprising one or more lenslets, arranged to generate one or more sub-images from one or more respective partial real images on the display associated with that channel, by each lenslet projecting light from the display to an eye position. The sub-images combine to form a virtual image viewable from the eye position so that different optical channels image a same portion of the display to different portions of the virtual image. A light switching system allows a flow of light through selected ones of the channels from the display to the pupil range and prevents a flow of light through other selected ones of the channels from the display to the pupil range. The light switching system is arranged to successively open the optical channels to allow light to flow successively through the optical channels and, while each of the optical channels is open, the display is arranged to display the one or more respective partial real images associated with that channel.

In another aspect, a display device comprises a display, operable to generate a real image, and an optical system, comprising a plurality of optical channels, each of the optical channels comprising one or more lenslets, arranged to generate a sub-image from a respective partial real image on the display, by each lenslet projecting light from the display to an eye position. The sub-images combine to form a virtual image viewable from the eye position so that different optical channels image a same portion of the display to different portions of the virtual image. A light switching system allows a flow of light through selected ones of the channels from the display to the pupil range and prevents a flow of light through other selected ones of the channels from the display to the pupil range. A synchronizing controller is operative to control the display and the light switching system to display successive ones of the partial real images while opening associated ones of the optical channels to allow light to flow through the associated ones of the optical channels.

In a further aspect, a method of displaying a given image comprises generating a succession of partial real images, each representing part of the given image and together representing the given image, and at least some of the partial real images occupying spatially overlapping positions, and successively imaging the partial real images to form respective sub-images viewable from an eye position, so that the sub-images combine spatially to form a virtual image viewable from the eye position so that spatially overlapping portions of different partial real images form different portions of the virtual image.

In a further aspect, a method of displaying a given image comprises generating a succession of partial real images, each representing part of the given image and together representing the given image, and at least some of the partial real images occupying spatially overlapping positions, and successively imaging the partial real images to form a sub-image viewable from an eye position. The sub-images combine spatially to form a virtual image viewable from the eye position so that spatially overlapping portions of different partial real images form different portions of the virtual image.

In an embodiment, during a sub-frame slot only one channel is illuminated. To avoid light entering through the other channels, a directional backlight can be used (see for instance Fattal 2013, U.S. Pat. No. 9,201,270 B2 to Fattal et al., and Wetzstein 2012) together with an LCD as digital display. When the angular emission pattern of the digital display cannot be switched, such as in OLED displays or in LCD displays using non-directional backlights, then an electronic shutter at the entrance (or at the light path) of each channel can be used to block the light from passing through undesired channels. Light going through a wrong channel may create a ghost sub-image. An electronic shutter can be made of a ferroelectric liquid crystal (FLC). A ferroelectric liquid crystal is advantageous because of its fast switching time which is typically below 100 µs.

Sub-images overlap, in general. This overlapping does not mean that these regions are brighter than the non-overlapping regions, even though these regions are displayed during more than one sub-frame slot.

The display or displays may be of the type called Light Field Displays, see Huang 2015, in particular those implemented by stacked transmissive LCDs. An LFD with just 2 stacked LCDs with a separator among them has a small thickness and is very attractive. Light Field Displays support focus cues which, together with the rest of the device, help to solve the vergence-accommodation conflict at a reasonable cost and volume. This conflict may lead to visual discomfort and fatigue, eyestrain, diplopic vision, headaches, nausea, compromised image quality, and it may even lead to pathologies in the developing visual system of children. These cascaded displays can also be used to just increase the density of opixels (spatial resolution). In particular, Heide 2014 showed that a dual-layer display can quadruple the apparent spatial resolution and double the effective refresh rate. The spatial resolution as well the depth of field can be increased even more when the eye is tracked (and the displayed information is restricted to that viewer position) as explained in Maimone 2015.

The display device may further comprise one or more of a sound producing device, and/or a camera and a display driver operative to reproduce on the display an image captured by the camera, or two of either or each to provide stereoscopic sound or vision.

The device may further comprise a head-tracking device and a display driver operative to reproduce on the display an image fixed to the physical ground.

The display device may further comprise a system to adjust the distance from the array of lenslets to the digital display to compensate for interpupil distance and/or defects of vision of the user.

The device may further comprise an eye-tracking device and a display driver operative to reproduce on the display an image which, when seen through the optics, is recognizable at the eye position detected by the eye-tracking device but not necessarily at other eye positions.

The succession of partial real images may be generated on a display, and at least one of the partial real images may occupy substantially a whole active area of the display.

The succession of partial real images may be generated on a display, at least two of the partial real images may occupy non-overlapping portions of the display, and successively imaging may then comprise imaging those two partial real images at the same time. The display may then display those two partial real images, and parts of the optical system associated with the union of the displayed partial real images may be activated, at the same time as a single open optical channel.

The light switching system may comprise shutters operative to selectively prevent light from flowing through associated ones of the channels. Instead, or in addition, the light switching system may be operative to control a direction in which light flows to or from selected portions of the display.

Successively imaging the partial real images may comprise successively imaging sets of simultaneously displayed partial real images, wherein at least one said set comprises a plurality of non-overlapping partial real images.

Successively imaging may comprise permitting light to flow through the channels cyclically in a repeating sequence. Each channel may be open, and the respective partial real image may be displayed at the same time, cyclically in that repeating sequence.

At least one channel may comprise two lenslets in parallel that together image one spatially continuous portion of the display to one spatially continuous partial virtual image.

The method may further comprise receiving an input image, defining parts of the input images as partial input images each assigned to a position, and generating the partial input images as partial real images so positioned that the corresponding sub-images align to form an uninterrupted virtual image of the input image. The display device may further comprise an image generator operative to receive an input image, to generate partial input images each assigned to a partial real image position on the display so that upon displaying the generated partial input images sequentially as said partial real images the corresponding sub-images align to form an uninterrupted virtual image of the input image. At least some of the partial real image positions may then overlap and contain partial real images that in those positions would not form part of a single uninterrupted image on the display.

Receiving an input image may comprise receiving input video, generating for each of a succession of images of the input video partial real images each so positioned that the corresponding sub-images align to form an uninterrupted virtual image of the input image. The image generator may be operative to receive input video, and to generate, for each of a succession of images of the input video, partial real images each so positioned on the display that the corresponding sub-images align to form an uninterrupted virtual image of the input image. The video may then be displayed on the display device by displaying the images of the input video in succession, and each of the images of the input video may then be displayed by displaying the partial real images of that image of the input video in succession.

The method may comprise directing the light from the sub-images to a pupil range that comprises an area on the surface of an imaginary sphere at the eye position of from 21 to 27 mm diameter, the pupil range including a circle subtending 15 degrees whole angle at the center of the sphere. All the optical channels may be aligned to direct the light from their respective sub-images to a pupil range of that size.

The method may comprise forming the real image on a digital display comprising object pixels, grouping the object pixels into clusters of contiguous pixels, causing each cluster to form a partial real image associated with a respective lenslet belonging to one of the optical channels, and grouping at least some object pixels into more than one cluster at different times, according to which of the respective optical channels is active. The display may be a digital display comprising object pixels, wherein the object pixels are grouped into clusters of contiguous pixels, each cluster forming a partial real image and associated with a respective lenslet that belongs to one of the optical channels, wherein at least some object pixels belong to more than one cluster at different times, according to which of the respective optical channels is active.

Substantially all imaging light rays falling on said pupil range through a given lenslet may come from an associated partial real image, and substantially all said imaging light rays falling on said pupil range from the associated partial real image may pass through the associated lenslet.

Substantially all imaging light rays exiting a given lenslet towards the pupil range and virtually coming from any one position of the virtual image may then be generated from a single position of the associated partial real image.

Successively imaging may comprise successively causing or permitting light to flow through selected ones of a plurality of optical channels from the display to the eye position and preventing a flow of light through other selected ones of the plurality of optical channels from the display to the pupil range.

Successively causing or permitting light to flow may then comprise operating shutters to selectively prevent light from flowing through associated ones of the channels.

Causing or permitting light to flow may comprise controlling a direction in which light flows to or from selected portions of the real image.

The optical channels may comprise lenslets forming the sub-images from the partial real images.

The display device may further comprise a mounting operative to maintain the device in a substantially constant position relative to a normal human head with one eye at the center of the imaginary sphere formed by the virtual screen.

There may be a second said display device, a mounting to position the first and second display devices relative to one another such that the positions of the respective imaginary spheres match the relative positions of the two eyes of a human being, and a display driver operative to cause the two displays to display objects such that the two virtual images combine to form a single image when viewed by a human observer with eyes at the center positions of the respective imaginary spheres.

The mounting may be operative to maintain the device in a substantially constant position relative to a human head with the eyes at the positions of the two imaginary spheres.

The mounting may include mounting features to hold corrective lenses in front of users' eyes with a defect of vision.

The displays of the first and second display devices may form a single display.

Another aspect provides a headgear comprising the display device of any of the above aspects, with a mount for positioning the display device on a human head with the eye position of the display device coinciding with an eye of the human.

The headgear may further comprise a second display device, which may be similar to the first, mounted with the eye position of the second display device coinciding with a second eye of the human. The two display devices may be identical, or may be mirror images of each other, and may share a single display.

Another aspect provides a method of generating image data for a display device, comprising receiving an input image, generating partial images corresponding to parts of the input image, and assigning positions to the partial images, at least some of the positions overlapping, so that if each partial image is successively displayed at its assigned position, and imaged to a virtual sub-image by a respective one of a plurality of channels of a suitably configured display device according to any of the above aspects, the virtual sub-images combine to form an uninterrupted virtual image of the input image.

A further aspect provides computer readable data, which may be embodied as a non-transitory computer readable storage device containing computer readable data, representing a plurality of partial images of an input image and positions for the partial images, at least some of the positions overlapping, so that if each partial image is successively displayed at its assigned position, and imaged to a virtual sub-image by a respective one of a plurality of channels of a suitably configured display device, the virtual sub-images combine to form an uninterrupted virtual image of the input image.

BRIEF DESCRIPTION OF DRAWINGS

The above and other aspects, features and advantages will be apparent from the following more particular description of certain embodiments, presented in conjunction with the following drawings. In the drawings.

DETAILED DESCRIPTION

A better understanding of various features and advantages of the present devices may be obtained by reference to the following detailed description and accompanying drawings, which set forth illustrative embodiments that utilize particular principles.

Figure 3:
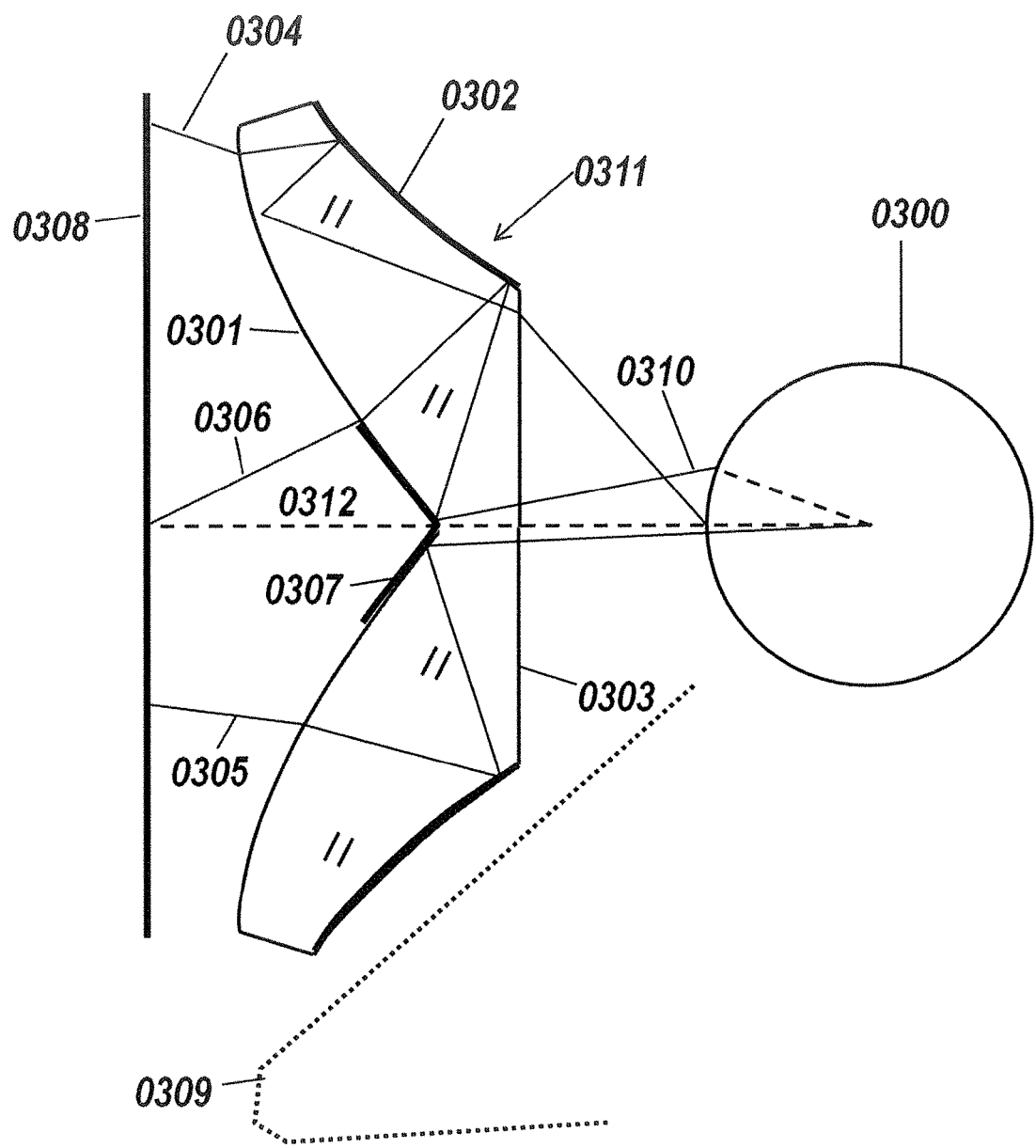
FIG. 3 is a schematic view of a 2-fold optical design for a Head Mounted Display.

Referring to FIGS. 3 to 9 and 10B to 14 of the accompanying drawings, and initially to FIG. 3, one embodiment of a Head Mounted Display comprises a piece of solid dielectric indicated generally by the reference numeral 0311 whose faces 0302 and 0307 are mirrored. This device images the digital display 0308 into the retina through the eye 0300. FIG. 3 is a side view of the cross section of a 2-fold design, indicating the position of the user's nose 0309 and eye 0300. In this 2-fold configuration, the digital display 0308 is shown placed in a vertical position. Rays 0304, 0305 and 0306 undergo a refraction at entry surface 0301, then a reflection on mirrored surface 0302, a reflection on surface 0301, and finally a refraction on exit surface 0303 to be directed towards the eye 0300. While the second reflection is performed by total internal reflection (TIR) in the case of ray 0304, in the cases of rays 0305 and 0306, it is performed by the mirrored portion of surface 0307.

This type of optical component is sometimes called RXI, referring to the refraction (R), reflection (X) and total internal reflection (I) that most of the useful rays undergo. Some of the RXIs disclosed herein resemble to some extent a device disclosed in U.S. Pat. No. 7,460,985 B2 to Benitez et al. for collimating the light of an LED for illumination applications, specifically for an automotive headlight. The light from an LED chip in that device enters a dielectric piece after a first refraction. After that, some rays suffer a total internal reflection, a metallic reflection and a final refraction. Although the sequence of ray incidences is similar to some embodiments disclosed here, such as that in FIG. 3, the two devices are actually completely different, since the prior art device is designed for illumination, uses the principles of Nonimaging Optics, see, for instance, Winston 2005, which is a framework completely different from the Imaging Optics to which the present devices relate. In particular, the concept of object, image, pixels, pupil range, image quality, etc., which are essential in the present devices, have neither meaning nor use in U.S. Pat. No. 7,460,985 B2. In spite of this difference, both sorts of optical device can be categorized as "RXI."

The surfaces of the RXI optic 0311 of FIG. 3 are freeform. The image shown in the digital display 0308 is divided into 2 clusters in such a way that when they are projected to the retina of the eye 0300 through the optics 0311 the two clusters sub-images combine smoothly in a single image, similarly as it is explained in PCT1. Each of the 2 symmetrical parts of the optical part 0311 (divided by the vertical plane represented by the central dotted line 0312) is called a lenslet. Each sub-image is formed on the retina through its corresponding lenslet. Light going through the wrong lenslet creates undesirable ghost images called optical cross-talk. The optical cross-talk between lenslets is avoided by the definition of a pupil range exactly in the same way as disclosed in PCT1: the edge ray 0310 of the pupil range impinging at the kink of surface 0301 is sent as 0306 to the cluster edge.

Figure 4:
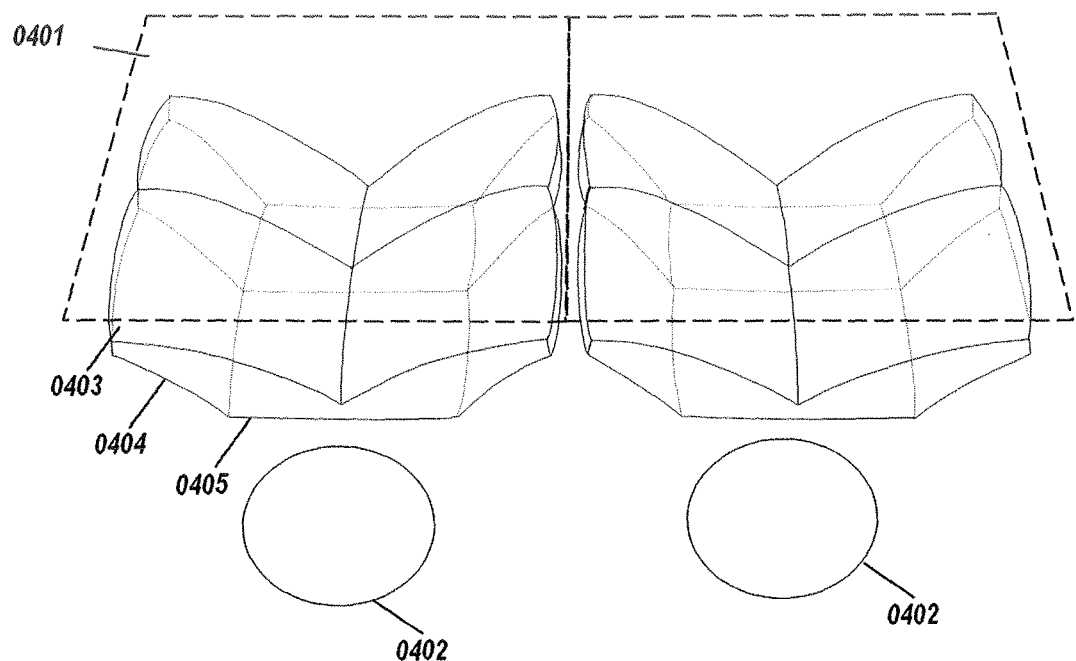
FIG. 4 is an isometric view of another optical design.

The same optical design is presented in FIG. 4, but in this case the lens is rotated 90°, so that the plane of FIG. 3 becomes a horizontal plane, and two lenses 0311 are mounted one above the other to form a single 4-fold lens. This orientation of the RXI allows for a configuration where both lenses work with a single standard 16:9 display of about 5 to 6 inches (125 to 150 mm) diagonal.

FIG. 4 shows a 3D illustration of a modified version of the configuration of FIG. 3, with two 4-faceted lenses (one per eye, metallized parts are not shown for drawing clarity sake) that work with a single standard digital display 0401 that is 145 mm (5.7") diagonal, with a 16:9 aspect ratio. As may be appreciated clearly from FIG. 4, each device placed in front of the eye 0402 has 4 lenslets, each lenslet consists essentially of a refractive surface 0403 closest to digital display 0401, a reflective surface 0404 and a refractive surface 0405 closest to eye 0402. The digital display 0401 sends light, which is refracted by surface 0403, reflected by surface 0404, totally internally reflected again on surface 0403, refracted on surface 0405, and finally reaches the eye 0402.

In FIG. 4 each eye has two channels, left and right, but each channel uses two lenslets, upper and lower. That configuration may be used to prevent excessive curving of the optical surfaces, especially the exit surface 0405, and to avoid chromatic aberration that may be a consequence of this excessive curving. By dividing any or all of the surfaces 0403, 0404, 0405 into 2 lenslets, the curvature of the surface is reduced, and chromatic aberration is mitigated.

This kind of designs (FIGS. 3 and 4) admits a modification in order to increase the resolution of the ipixels on the virtual screen, by time division multiplexing the image shown on the digital display. This multiplexation is possible thanks to several shutters that alternatively block the rays coming through each of the lenslets. This embodiment may use a fast ferroelectric light crystal display (FLCD) acting as a shutter. The FLCD works as a classical half-wave plate whose optic axis can be reoriented by an applied field. Benefits of FLCDs are their high resolution and very quick switching time (less than 100 µs). In reference U.S. Pat. No. 4,924,215 to Nelson these FLCDs are also used as shutters. According to Shilov 2010, Toshiba's active-shutter stereo 3D glasses have 0.1 ms (open to close/decay) and 1.8 ms (close to open/rise) response speed, whereas many competing solutions declare 0.3 ms and 3.7 ms speeds respectively, or even 2 ms "typical" response time.

Figure 5:
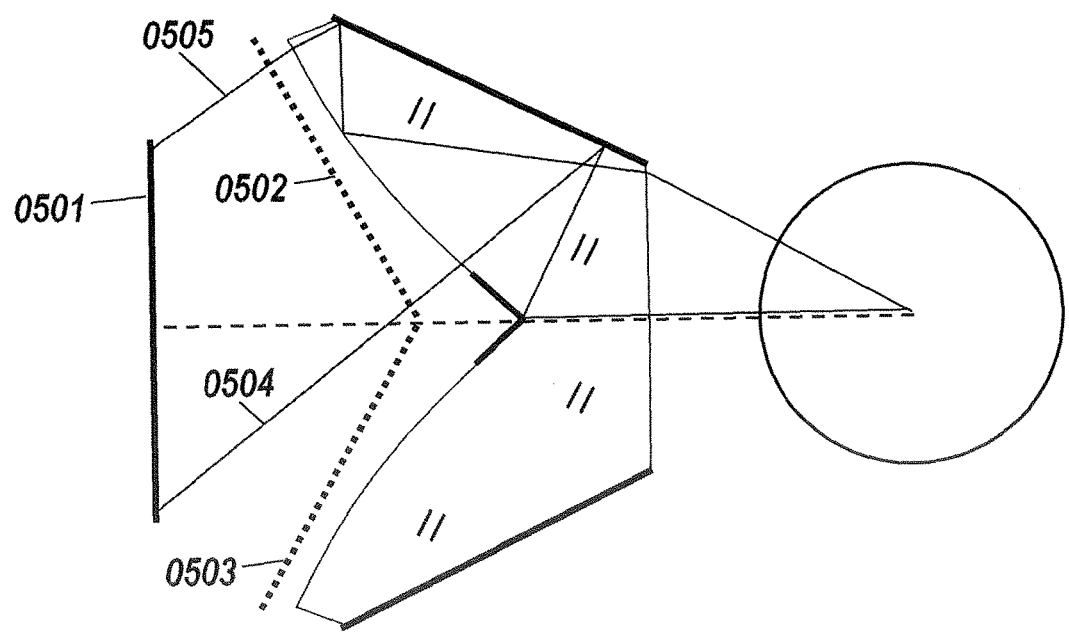
FIG. 5 is a vertical cross section view schematic of an optical configuration for a 2 channels 2 subframes display device.

This new embodiment is presented in FIG. 5. It is also a 2 lenslet example, where the digital display 0501 is shown on the left side. Unlike the design of FIG. 4, the whole of digital display 0501 is the object of each of the upper and lower lenslets. There is a single cluster at a time, which in this case occupies the full digital display.

As shown in FIG. 5, the digital display emits extreme rays 0504 and 0505 for the top lenslet, which are received by the eye only when the top shutter 0502 is open. In this situation, the bottom shutter 0503 is closed; hence the eye only receives light from the top lenslet. When the top shutter 0502 is closed and the bottom shutter 0503 is open, then the eye receives information only through the bottom lenslet of the lens. In this embodiment there are 2 channels corresponding to 2 sub-frame slots and a single lenslet per channel. Each lenslet images the digital display 0501 onto a different region of the virtual screen, so the top lenslet transmits the top half of the virtual screen, while the bottom lenslet transmits the bottom half of the virtual screen. Strictly speaking, the two sub-images overlap, because they must allow for the eye moving within the pupil range, as it is common in most of the multi-lenslet designs disclosed herein. These are the 2 sub-images, which together fill completely the virtual screen.

During the first sub-frame slot of a frame, only the information corresponding to the top sub-image is shown, while the second (and last) sub-frame slot shows the information of the bottom sub-image. If the transition between these two sub-frame slots is performed fast enough, then the eye perceives a global tiled or overlapped image coming from both lenslets, i.e., it will perceive a total virtual screen that is up to almost double what we initially had in the vertical direction. This makes use of the same "persistence of vision" effect happening in a traditional Cathode Ray Tube where the combined persistence of the phosphor of the screen and that of our retina creates the illusion of a steady image from a single scanning point (only one point is being drawn at a time) when the electron beam is raster scanned on the CRT screen.

Figure 6A:
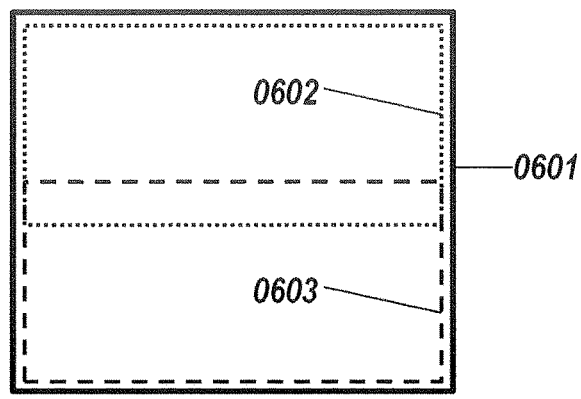
FIG. 6A is a front view of a virtual screen distribution among 2 time multiplexed sub-images.
Figure 6B:
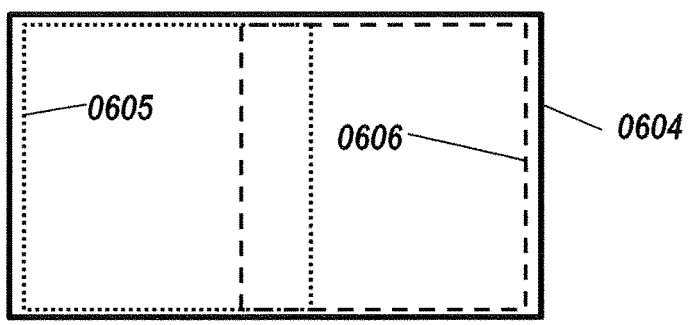
FIG. 6B is a front view of another virtual screen distribution among 2 time multiplexed sub-images.
Figure 6C:
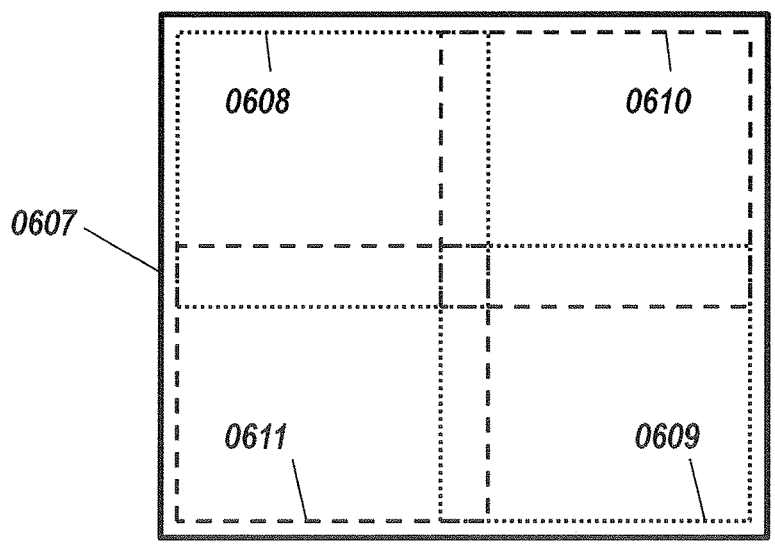
FIG. 6C is a front view of a virtual screen distribution among 4 time multiplexed sub-images.

Referring now to FIGS. 6A, 6B, and 6C (collectively FIG. 6), FIG. 6A represents a virtual screen 0601 using a standard 16:9 digital display per eye. The digital display is placed in a horizontal position (i.e., with its longest dimension parallel to the floor), and the lens is formed so that the upper and lower virtual images 0602, 0603 of the display overlap, so that the embodiment of FIG. 5 generates a virtual screen with approximately a 1:1 aspect ratio (i.e., similar vertical and horizontal field of views). The explanation of how the vertical field of view is doubled can be seen in FIG. 6A, which represents the virtual screen 0601 for this design. The dotted rectangle 0602 represents the top sub-image of the virtual screen, generated by the top channel, while the dashed rectangle 0603 represents the bottom sub-image of the virtual screen, generated by the bottom channel. The addition of both sub-images, as explained above, generates a larger square-shaped total image. The sub-images may overlap in the central region, as shown in FIG. 6.

An alternative configuration uses a single standard 16:9 digital display with about 145 mm (5.7 inch) diagonal for both eyes, instead of a digital display per eye as above, although it is not restricted to that size. In this case, the RXI is rotated 90° being placed in horizontal position, so the two halves of the shutter are aligned left-right. This alternative configuration leads to a horizontally elongated field of view, with larger field of view in the horizontal direction.

FIG. 6B shows the generation of a virtual screen 0604 with a 16:9 aspect ratio using the RXI in a horizontal position. The physical screen 0308 is now square. The dotted square 0605 represents the left sub-image of the virtual screen, generated by the left channel, while the dashed square 0606 represents the right sub-image of the virtual screen, generated by the right channel, resulting in a larger rectangle-shaped total field of view. In the case of the embodiment of FIG. 6B there are 2 lenslets per channel.

The idea behind time multiplexing is increasing the number of ipixels by representing the image in several consecutive parts within the frame period and using all the available opixels for any of these image parts. Obviously the success of such strategy depends on the availability of digital displays with high switching rate such as OLED, transmissive or reflective FLC or DMD digital displays. In FIG. 5, the image is divided in two parts and each part was shown to the eye during half the frame period. Now we will disclose architectures in which the image is divided into $\tau^2$ subimages ($\tau^2$ is an integer greater than 1), and the frame period is divided into $\tau^2$ corresponding sub-frame slots within each of which a subimage is shown to the eye. The part of the optics working during a sub-frame slot is called a channel. There are as many channels as sub-frame slots and as subimages, i.e., $\tau^2$ channels. In two of the architectures disclosed herein, each of the different subimages is formed by a set of square or hexagonal image islands regularly spaced over the field of view. The union of all these subimages is the whole image, which thanks to the persistence of our retina, is what the eye sees. The union of all sub-frame slots is the frame display time (or frame period). To be more precise, the digital display may be set to black between sub-frame slots to reduce motion blur. In that case we will assume that this black out time belongs to some sub-frame slot so that the union of the sub-frame slots is the whole frame period.

FIG. 6C shows an example of overlapping four channels 0608 0609, 0610, 0611 in a two by two array to form a virtual screen 0607 that is approximately the same shape as the physical screen of the digital display. In the interests of simplicity, FIG. 6C has been drawn with a squarish screen, but it can of course have any desired aspect ratio.

Figure 7:
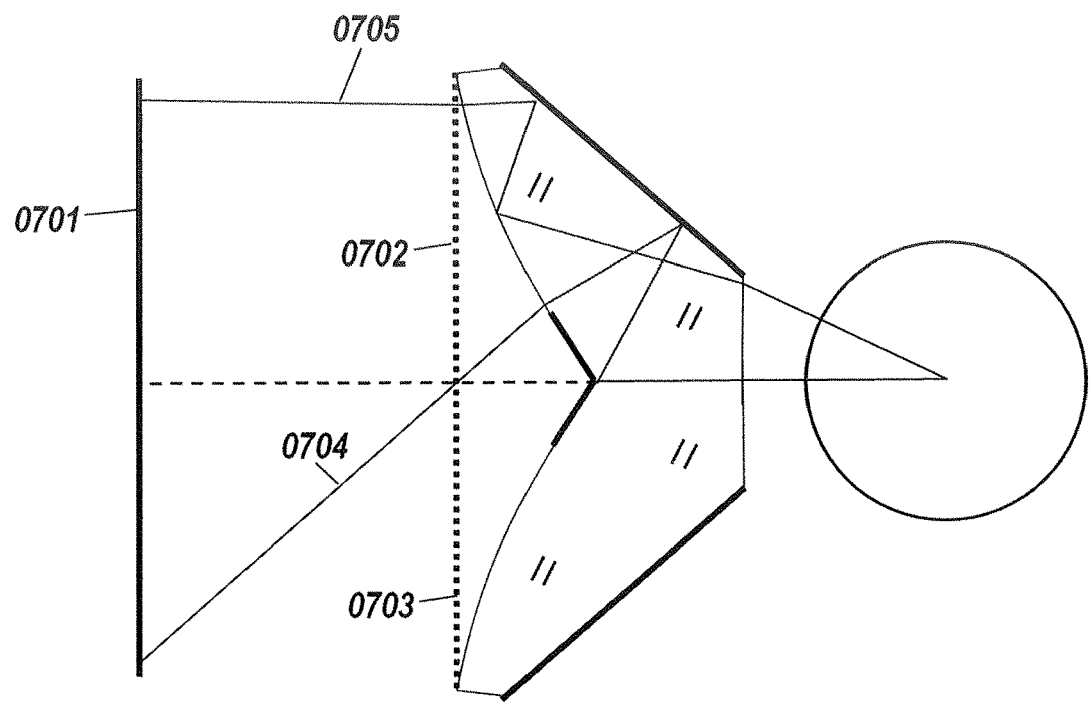
FIG. 7 is a diagonal cross section view schematic of an optical configuration for a 4 channels 4 subframes display device with flat shutters. It is also a vertical cross section view schematic of an optical configuration for a 2 channels 2 subframes embodiment with flat shutters.
Figure 8:
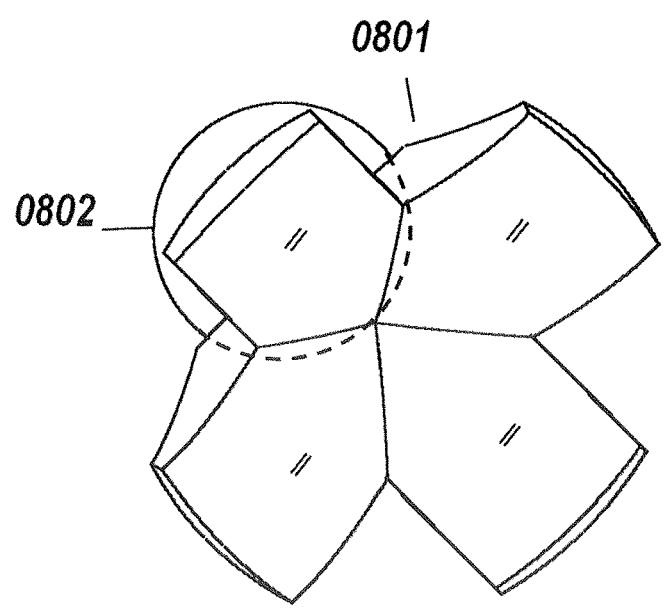
FIG. 8 is an isometric schematic view of the device whose diagonal cross section is shown in FIG. 7.

FIGS. 7 and 8 show a 4-fold configuration, where TDM with $\tau^2$=4 is applied. FIG. 7 shows the diagonal 2D cross-section of the device, showing as well the diagonal profile of the digital display 0701. The explanation of how the rays are alternatively blocked by the shutters is analogous. Obviously, in this situation we will have 4 shutters (one per channel) instead of 2. FIG. 7 shows the diagonal section of two shutters, 0702 and 0703, and the extreme rays 0704 and 0705 of top lenslet in the figure. The shutters shown here are all coplanar, which is easier to implement than the angled shutters 0502, 0503 shown in FIG. 5. FIG. 8 shows a front view of the 4-fold configuration 0801 of FIG. 7 showing the 4 channels 0802. The 4-fold design shown in FIGS. 7 and 8 is also compatible for working with a single 16:9 digital display with about 5" to 6" (125 to 150 mm) diagonal (0607 in FIG. 6C) for both eyes but it is not restricted to it. Hence, the top left lenslet of the lens generates the top left section of the virtual screen, the top right lenslet generates the top right section of the virtual screen and so on. This is represented by FIG. 6C, where the two dotted squares 0608 and 0609 represent the section of the virtual screen generated by the top left and bottom right lenslets, while the dashed squares 0610 and 0611 represent the section of the virtual screen generated by the top right and bottom left lenslets, resulting in a larger total field of view with aspect ratio about 1:1, i.e., with similar horizontal and vertical field of views.

The 2-fold lens in FIG. 5 can be slightly modified to also allow for coplanar shutters. The vertical cross section of this case can also be represented by FIG. 7. The two coplanar shutters can be made of a single LCD with 2 pixels each one of them having the area of the open shutter. In a 2-fold system such as this one, when one shutter is open the other one is closed so the shutter system has only 2 states and then it can be manufactured with a single Liquid Crystal pixel. This can be implemented using an anisotropic film such as the ones manufactured by Rolic Technologies Ltd., in Gewerbestrasse 18, 4123 Allschwil, Switzerland (http://www.rolic.com/products/display/rolicr-lcmo-optical-films/rolicr-lcmo-1x). These films can be manufactured with different retardation for different zones of the film, for example, with different retardation for each one of the shutters such that the polarization of the light exiting the two shutters is orthogonal one to the other when both shutters are lit with the same polarized incoming light. Using a film like this in between the two polarizers of a regular LCD, a single-pixel LCD display can be achieved such that the two states of the liquid crystal (with and without electric field) correspond to the 2 states of the shutter system (2 shutters open and closed in opposition). That simplifies the design of the device, because no separation corridor is required between the two shutters (as it would be required if each shutter had its own electrode) and only a single drive signal is required to the LCD shutter layer, and there is no risk of the two shutter channels becoming desynchronized. However, it is then not possible to turn off the digital display using the shutters, because there is no state with the two shutters both closed. As previously mentioned, turning off the whole digital display at some time within the frame period, especially when changing between sub-frames, may be interesting for reducing motion blur.

The control of the open lenslet can also be done without shutters. An alternative option is the use of directional backlights, as described in Fattal 2013, U.S. Pat. No. 9,201,270 B2 to Fattal et al., and Wetzstein 2012. Unlike conventional backlights where the light exits the backlight in a relatively large angular spread that cannot be modified, in directional backlights the direction of the light exiting the backlight is controlled and it can be changed as function of time and space. This allows, for instance, that during each subframe the directional backlight sends light only towards the entrance of the lenslet corresponding to that subframe. Directional backlights can also be used together with shutters to minimize optical cross talk and relax the directional backlight design requirements.

In order to reduce the volume of the optics we can also apply the strategy disclosed in PCT1 and split each one of the subimages into different clusters. This has already been done in FIG. 4 where 2 lenslets per channel (and so 2 clusters per subimage) have been used, in that case to prevent excessive convex curving of the surface 0405. The combination of this image splitting strategy with time multiplexing (TDM) needs some concepts to be defined. This is done in the list of definitions given above. Consider a general case in which the optics is composed by an array of channels, each one of them containing several lenslets (these lenslets are not necessarily made of refractive elements). Each lenslet forms the image of its cluster in the virtual screen. This image is sent to the eye only during the sub-frame slot when its channel is open. The union of the images of the clusters of the same channel is called subimage. In a non-time-multiplexing display device, there is a cluster for each lenslet and any opixel belongs to one and only one cluster. In the TDM case an opixel may belong to several clusters if the clusters correspond to different sub-frame slots. Recall here that the cluster is the group of opixels that illuminates the pupil range through a given lenslet. This group of opixels is imaged in the virtual screen through their corresponding lenslet. During a sub-frame slot, each opixel can belong to only a single open cluster and the set of all open clusters form the digital display. Shutters are used to avoid light from the digital display leaving through a wrong lenslet, i.e., through the lenslets belonging to other than the open channel. So, within a sub-frame slot there is one open channel whose lenslets (with their corresponding clusters) are obviously open too. The remaining channels are closed. Any lenslet belongs to one and only one channel and, in general, there is no channel open during more than one sub-frame slot of the frame time. The set of all open clusters coincides always with the whole digital display, although the open clusters are different for each sub-frame slot.

The goal in TDM application is taking advantage of high digital display frame rates (as those of some OLED displays) and long eye persistence to increase the number of available ipixels. Each channel is open during one of the $\tau^2$ sub-frame slots and during this time it is showing a sub-image which is generated with the totality of opixels. Then, the full image is shown in $\tau^2$ consecutive sub-frame slots using $\tau^2$ times the number of opixels available in the digital display. This means that the number of ipixels is upper bounded by $\tau^2$ times the number of opixels. The upper bound is in general not reached because of the image overlapping inherent to lenslet arrays, i.e., because one ipixel may be formed from more than one opixel, or because, as shown in FIG. 6, the sub-images are deliberately overlapped to avoid the risk of a visible seam.

The increase of ipixels obtained with time multiplexing could be used to increase the field of view, the pupil range, the resolution or any combination of the three. For instance, the resolution (as number of ipixels per degree) is increased by using a larger focal distance lenslet design (it could be up to $\tau$ times greater).

The time multiplexing concept described herein is also applicable to Light Field Displays (LFD), the only difference is in the opixel to ipixel mapping to implement the image processing. LFDs have already been applied to conventional stereoscopes by Huang et al ("Huang 2015").

Figure 9:
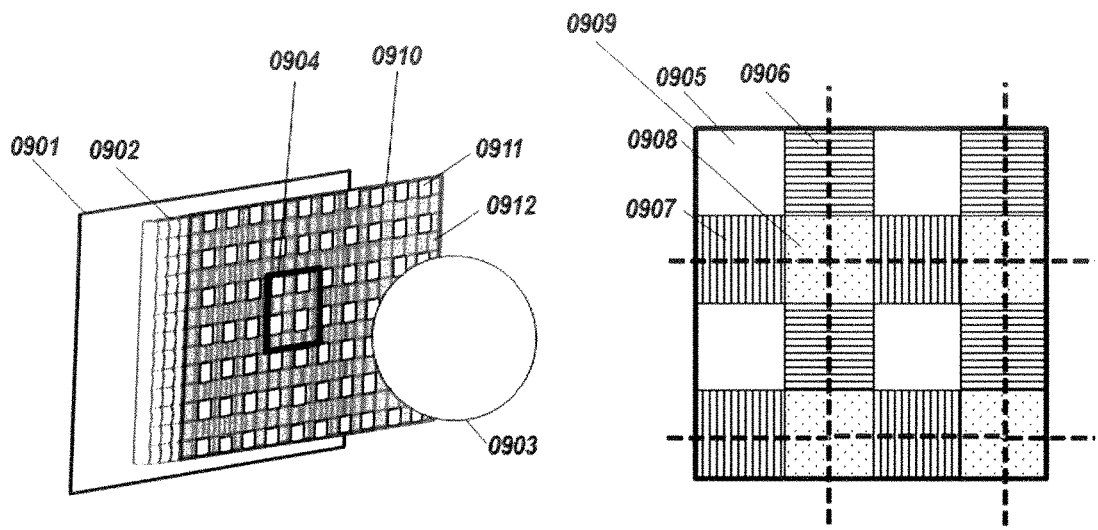
FIG. 9 is a schematic view of a display device.

Let us explain the TDM concept further with another example for $\tau^2=4$ (later we will illustrate the cases $\tau^2=2$ and $\tau^2=3$). In the configuration shown in FIG. 9, we use a lenslet array optics 0902 grouped in $\tau^2=4$. FIG. 9 left shows a digital display 0901 with lenslet array optics 0902 placed in front of it. The shutter array 0910 is shown with opened shutters 0911 and closed shutters 0912. The human eye is 0903. The FLCD shutter may be placed between the lenslet array and the eye, as shown in FIG. 9, or between the digital display and the lenslet array. A group of 16 lenslets 0904 in the central part of the lenslet array 0902 is highlighted. Their corresponding 16 opixel clusters 0909 are shown in the enlarged detail on the right side of FIG. 9. Each cluster contains a number of opixels which is not relevant now. The clusters in the right side of FIG. 9 are shaded with different patterns to indicate the channel to which each cluster belongs: 0905—white rectangle, 0906—rectangle with horizontal stripes, 0907—rectangle with vertical stripes and 0908—dashed rectangle.

Figure 10A:
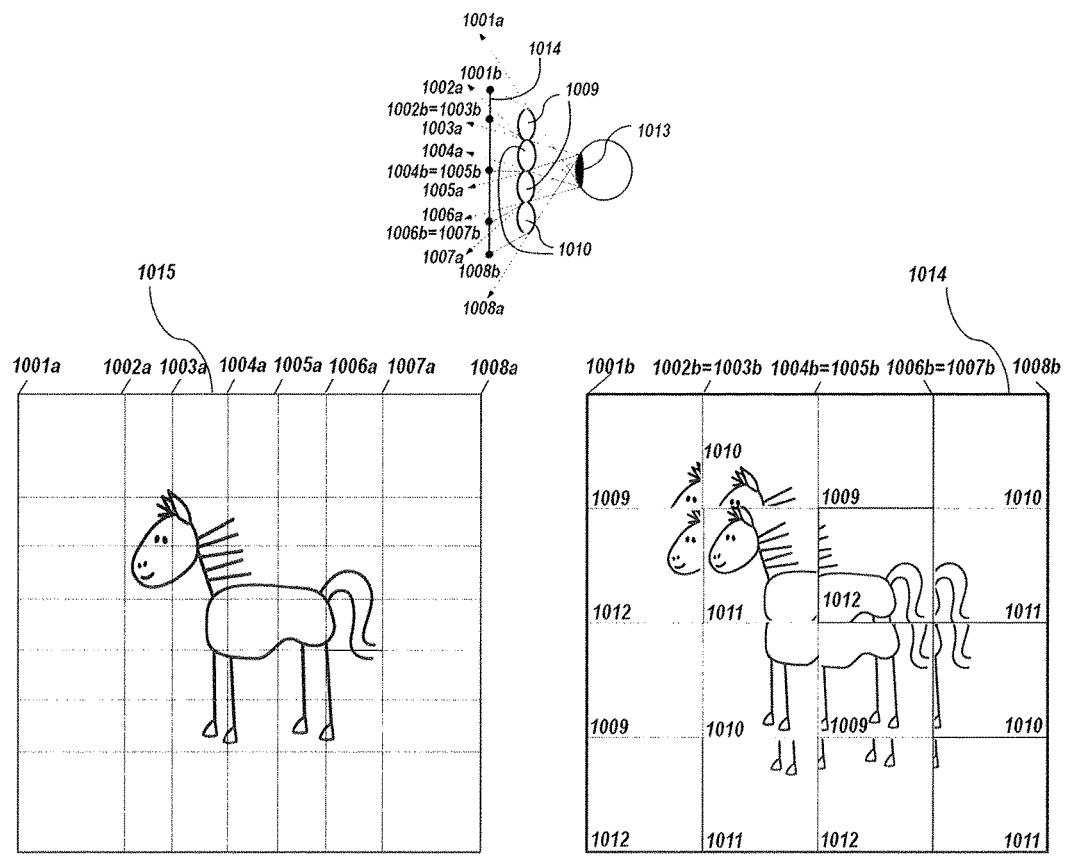
FIG. 10A is a diagram showing a distribution of subimages of the virtual screen and a cluster distribution of the digital display for a non-time-multiplexing embodiment.

Analogously with the introductory example of 4 lenslets described in Section 6.1 of PCT1, paragraphs [0158]-[0166], we describe herein an equivalent example of a larger lenslet array of which we are going to analyze its 16 central lenslets. We start in FIG. 10A with the description of a non-time-multiplexing case (prior art). FIG. 10A (bottom right) shows the digital display 1014 divided into its opixel clusters. The lenslet array optics forms the ipixels image (shown in FIG. 10A bottom left) on the virtual screen 1015 (which for simplicity has been drawn here flat with a rectangular contour). Every opixel belongs to a single cluster. The intersection of any two clusters is the empty set and the union of all clusters is the whole digital display.

Figure 10B:
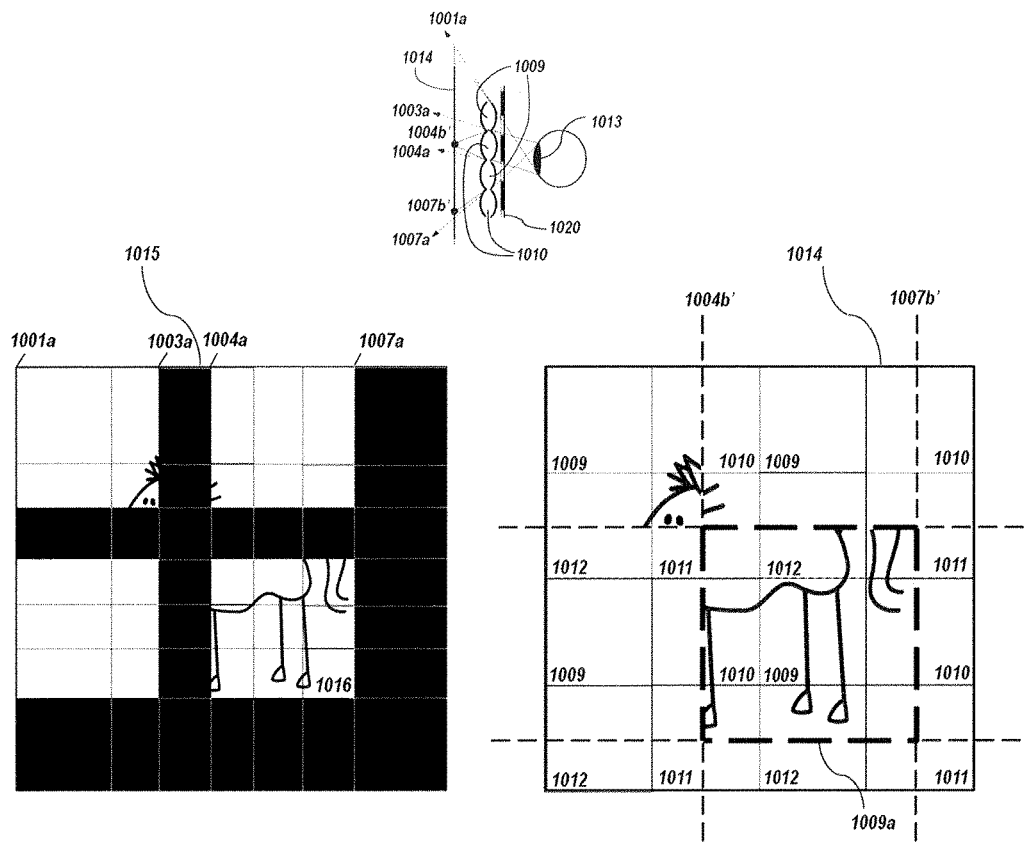
FIG. 10B is a diagram similar to FIG. 10A for a first sub-frame slot of the display device of FIG. 9.

In FIGS. 10B, C, D and E, we show how 16 similar lenslets work with TDM. The left column in each of FIGS. 10B to 10E shows the ipixel image and the right column shows the opixel digital display 1014 with the open clusters division corresponding to the particular sub-frame slot. The 4 rows (B, C, D and E) represent the 4 sub-frame slots. The open clusters on the right column are bounded by the dashed lines.

The right column in FIGS. 10B, 10C, 10D and 10E also shows the contours of the 16 central lenslets. As said before, since $\tau^2=4$ we group the lenslets in four channels 1009, 1010, 1011 and 1012. The open clusters display portions of the image (see it in virtual screen 1015 of FIG. 10A) with a certain shift. The shift is such that some parts of the image are displayed by more than one cluster. A two-dimensional schematic drawing of the non-time-multiplexing case has been added on top of FIG. 10A. FIG. 10A top represents a bottom view of a horizontal cross-section of one of the rows of the arrangement. It shows the relevant rays to define the edges of the mapping between opixels and ipixels. In this drawing, the virtual screen with the ipixels is placed at infinity, so it is the direction of rays 1001a, 1002a, 1003a, 1004a, 1005a, 1006a, 1007a and 1008a that indicates the ipixels positions on the virtual screen. The drawing is two-dimensional for simplicity, but the central part of the actual array that projects the image on the left of FIG. 10A is three-dimensional and contains 16 lenslets, in a 4×4 array, and not only the 4 lenslets shown at the top of the FIG. 10A, which correspond to the central part of a single lenslet-array row. This two-dimensional scheme of FIG. 10A top is used to explain the horizontal coordinates of the mapping between opixels and ipixels. Analogous reasoning applies to the vertical coordinates. The directions defined by the rays 1001a to 1008a in FIG. 10A top correspond to pixels which could be represented by dots on the virtual screen. Nevertheless, since FIG. 10A top is a cross section, any of the lines 1001a, 1002a, 1003a, 1004a, 1005a, 1006a, 1007a and 1008a in FIG. 10A left represent the set of ray directions whose representation in FIG. 10A top projects on the same ray trajectory. The lines 1001b, 1002b, 1003b, 1004b, 1005b, 1006b, 1007b and 1008b in FIG. 10A right are the opixels that are imaged by their corresponding lenslets into the lines 1001a, 1002a, 1003a, 1004a, 1005a, 1006a, 1007a and 1008a of the virtual screen (FIG. 10A left). The clusters are labeled in FIG. 10A right with the numbers of their respective lenslet. Some of these lenslets (1009 and 1010) are shown FIG. 10A top. The cluster's contours in FIG. 10A right coincide with the projection of the lenslets in this particular case.

FIG. 10B illustrates the first sub-frame slot of the time-multiplexing case. A two-dimensional schematic drawing of the time-multiplexing case has also been added at the top of FIG. 10B. FIG. 10B top represents a top view of a horizontal cross-section of one row of this new time-multiplexing arrangement. In comparison with FIG. 10A top, the shutter array 1020 is added between the eye and the lenslet array. The shutter can alternatively be placed between the digital display and the lenslet array. Similarly as before, the virtual screen with the ipixels is placed at infinity in FIG. 10B top. The direction of rays 1001a, 1003a, 1004a, and 1007a indicate ipixels positions on the virtual screen. Again, the drawing is two-dimensional for simplicity, but the central part of the actual array that projects the image on the left is three-dimensional and contains 16 lenslets and not only the 4 lenslets shown on the top of FIG. 10B, which correspond to a single lenslet-array row. This two-dimensional scheme of FIG. 10B top helps to explain the horizontal coordinates of the new mapping between opixels and ipixels for the open clusters of the first sub-frame slot of the time-multiplexing case. FIG. 10B top shows the relevant rays to define the edges of the new mapping between opixels and ipixels. Analogous reasoning applies to the vertical coordinates.

Especially, the mapping of the open cluster 1009a is highlighted. The channel 1009 (FIG. 10B right) opens during the first sub-frame slot (FIG. 10B). The cluster 1009a (FIG. 10B right) belongs to this channel. This cluster generates the portion of the image 1016 (FIG. 10B left) that is bounded by the edge rays 1004a and 1007a reaching the edges of the pupil range 1013 (FIG. 10B top). This portion of the image 1016 is bounded by the vertical lines 1004a and 1007a in the virtual screen 1015 (FIG. 10B left).

In this specific example illustrated in the FIG. 10B, the lenslet 1009 maps edge rays 1004a and 1007a onto 1004b' and 1007b' on the digital display 1014 (FIG. 10B right). The continuous lines in FIG. 10B right are the projection of the lenslets contours. There are 16 lenslets each one of which is labeled with the channel number (1009, 1010, 1011 and 1012). Four lenslet cross sections can be seen in FIG. 10B top. The lenslets of the same channel map the complete digital display in different non-connected portions of the virtual screen, i.e., during a sub-frame slot open clusters do not overlap, and the union of all open clusters equates the full digital display. This is why the two lenslets labeled 1009 in FIG. 10B top map the opixel 1004b' in two different ray direction sets of the virtual screen: 1003a and 1004a. Other portions of the virtual screen in this sub-frame slot are represented by open clusters that belong to the same channel 1009.

As is apparent from the drawings, the clusters in the time-multiplexing case (FIG. 10B) such as 1009a are 4 times bigger than those of non-time-multiplexing case (FIG. 10A) whose size is similar that of a single lenslet 1009 while the image portion they show has the same size for TDM and non-TDM. This means that there are 4 times more opixels in the TDM case, although they can only be displayed ¼ of the time.

Figure 10C:
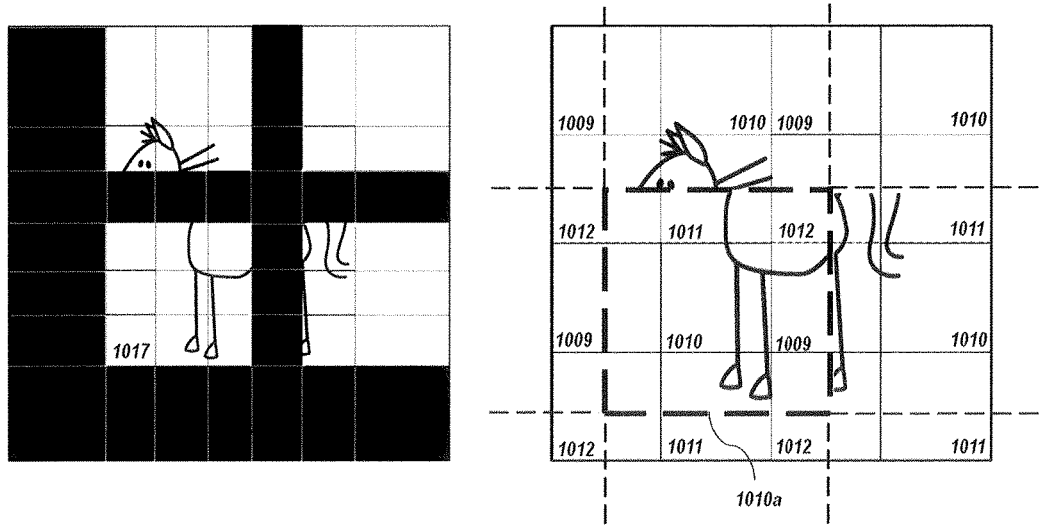
FIG. 10C is a diagram similar to FIG. 10A for a second sub-frame slot of the display device of FIG. 9.
Figure 10D:
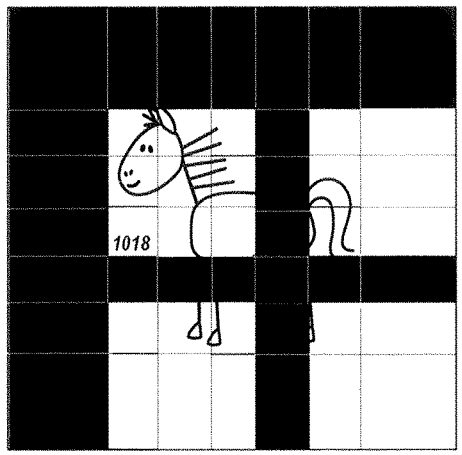
FIG. 10D is a diagram similar to FIG. 10A for a third sub-frame slot of the display device of FIG. 9.
Figure 10D:
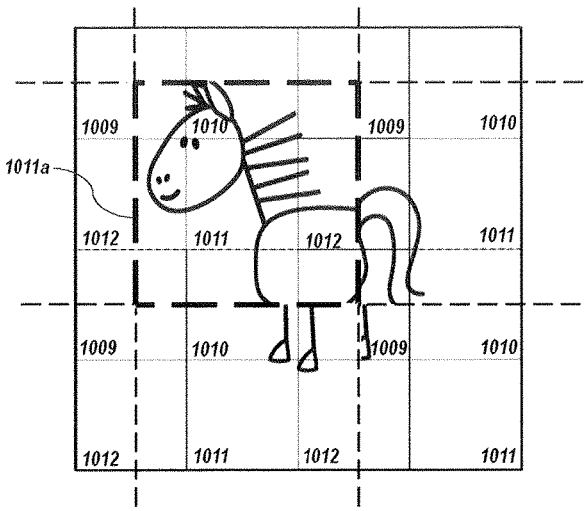
Figure 10E:
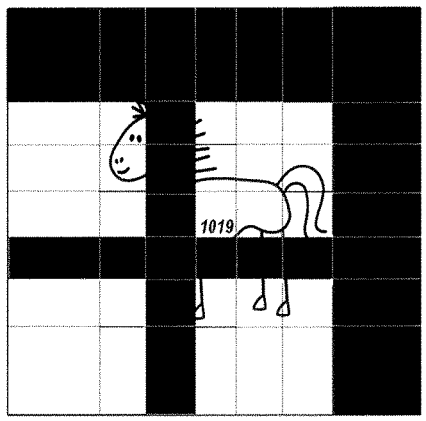
FIG. 10E is a diagram similar to FIG. 10A for a fourth sub-frame slot of the display device of FIG. 9.
Figure 10E:
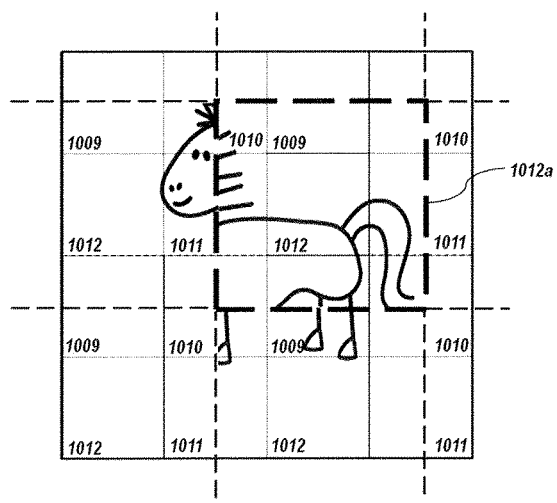
Figure 11A:
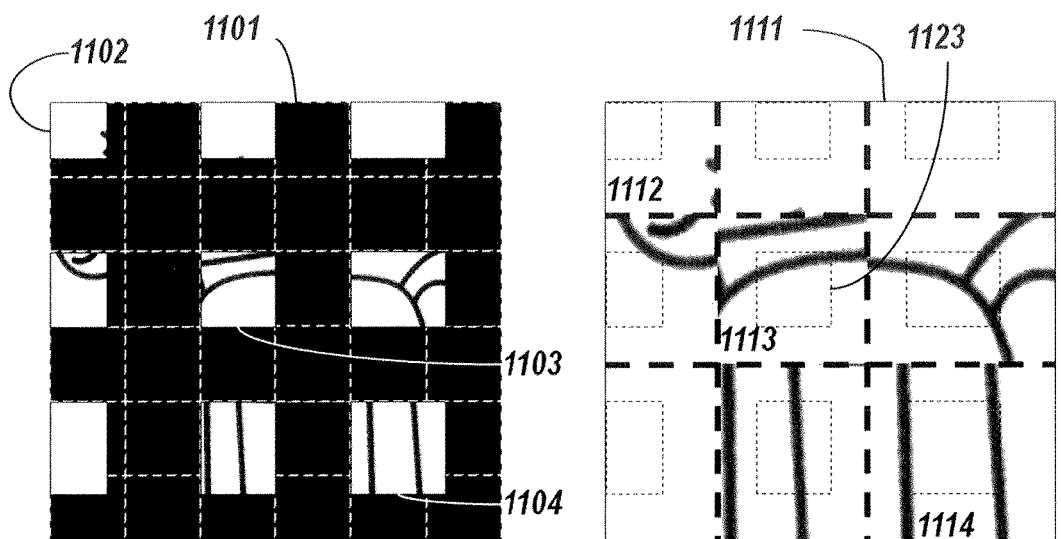
FIG. 11A shows the subimage distribution of the virtual screen and the cluster distribution of the digital display for full use of the digital display during the first sub-frame slot.
Figure 11B:
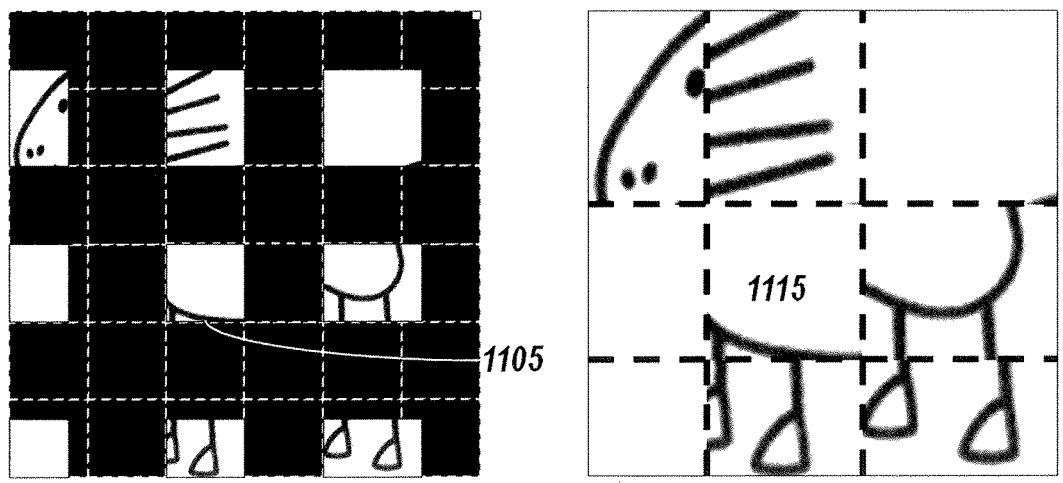
FIG. 11B shows the subimage distribution of the virtual screen and the cluster distribution of the digital display for full use of the digital display during the second sub-frame slot.
Figure 11C:
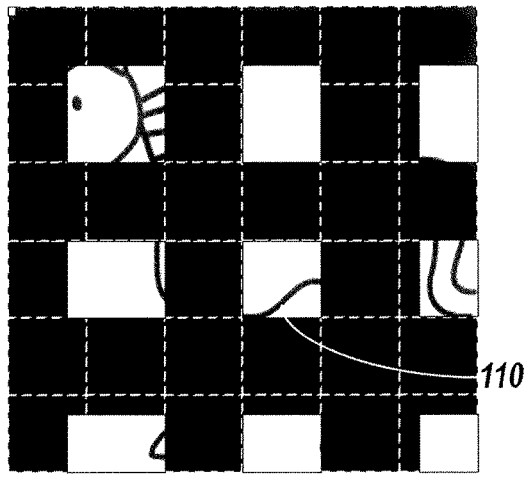
FIG. 11C shows the subimage distribution of the virtual screen and the cluster distribution of the digital display for full use of the digital display during the third sub-frame slot.
Figure 11C:
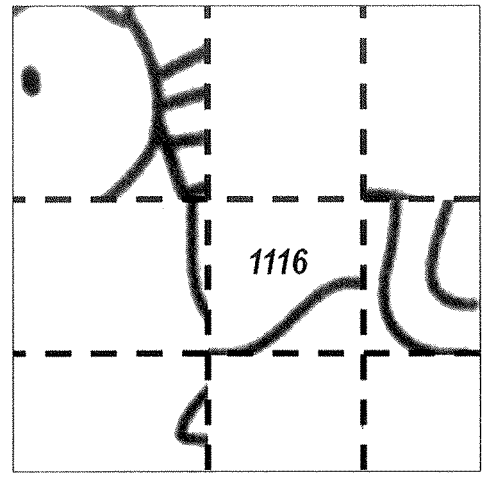
Figure 11D:
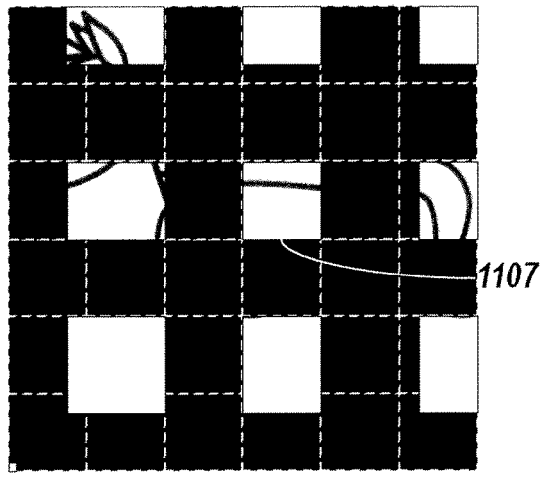
FIG. 11D shows the subimage distribution of the virtual screen and the cluster distribution of the digital display for full use of the digital display during the fourth sub-frame slot.
Figure 11D:
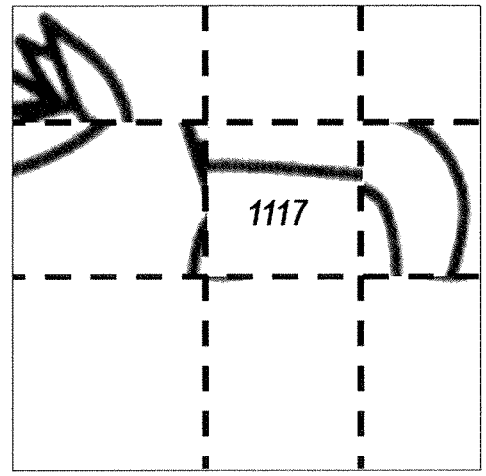

Analogous reasoning applies to the subsequent sub-frame slots. FIG. 10C illustrates the second sub-frame slot. Now, the channel 1010 (FIG. 10C right) is open. The open cluster 1010a generates the portion of the image 1017, meanwhile other portions of the image shown in this second sub-frame slot are represented by clusters of the same channel. The third sub-frame slot is represented in FIG. 10D. Now, the open channel is labeled as 1011 (FIG. 10D right). The portion of the image 1018 is represented by the open cluster 1011a. FIG. 10E illustrates the fourth sub-frame slot. The cluster 1012a represents a portion of the image 1019 on the virtual screen (FIG. 10E left).

FIG. 10 also illustrates the two types of overlapping present in the time multiplexing scheme using lenslet arrays: 1) clusters of different sub-frame slot do intersect. Any opixel belongs to $\tau^2$ different clusters, for instance, the ones in the digital display center that belong to the four clusters 1009a, 1010a, 1011a and 1012a. This cluster overlapping is characteristic of time multiplexing and has the consequence that the number of ipixels could be up to $\tau^2$ times the number of opixels. 2) The sub-images of adjacent clusters (for instance the sub-images 1016, 1017, 1018 and 2619) also overlap, i.e., there are ipixels that are seen through more than one lenslet. This sub-image overlapping is characteristic of lenslet arrays and consequently it also appears in the non-time-multiplexing case of FIG. 10A bottom. This overlapping has the consequence that the number of ipixels is usually smaller than $\tau^2$ times the number of opixels, thus this sub-image overlapping (which is necessary for decreasing the optics volume) competes against the resolution improvement provided by TDM. This sub-image overlapping led to the concept of web associated to an ipixel in section 6.2 of PCT1. According to PCT1, a web is the set of opixels that are mapped to the same ipixel. For TDM this definition has to be modified: a web is the set of opixels mapped to the same ipixel during the same sub-frame slot.

When the open lenslets of the same channel are sufficiently isolated one from another, then the open clusters do not share information and consequently the webs are formed by a single opixel in the preceding example. This is the case of FIG. 10. Nevertheless, clusters open in different sub-frame slots do share information, as we have said before. However, opixels close to the boundary of the digital display or at the center of the clusters have a one-to-one correspondence with ipixels.

One desirable design condition is that the union of all open clusters equates to the full digital display. If all open clusters were equal in size, then the contour of the union of all of them would shift from one sub-frame slot to another making it usually impossible to fulfill this condition, since the contour of the digital display does change. For that reason, some clusters near the boundaries of the digital display may be defined bigger than the remaining clusters, such that the contour of the union of all open clusters is coincident with the contour of the digital display at any sub-frame slot. These bigger clusters may have assigned a bigger sub-image to keep the ratio of ipixels to opixels constant over the whole digital display.

A possible arrangement of clusters and subimages to use the full digital display during all the sub-frame slots is shown in FIG. 11. As in FIG. 10, the left column illustrates the subimages on the virtual screen 1101 and the right column shows the clusters (bounded by the thick dashed lines) on the digital display 1111. There are 4 channels (and so 4 sub-frame slots) and 9 lenslets per channel (total of 6×6=36 lenslets). There is 1 subimage per lenslet. The rows in FIG. 11 correspond to the 4 sub-frame slots. FIG. 11A (first sub-frame slot) labels some particular clusters: The smallest cluster 1112, the largest cluster 1114, and a central cluster 1113. The central cluster 1113 is the only regular cluster. The other two clusters have a size that has been adapted to their situation on the digital display. The open lenslet exit contours during that sub-frame slot are the ones drawn with thin dashed lines, such as 1123 which is the lenslet imaging cluster 1113 into the subimage 1103. These open lenslets are not highlighted in FIGS. 11B, C and D. In the example given in FIG. 11 there is no subimage overlapping, for simplicity of the explanation, so the union of the subimages shown in the left column forms the full image on the virtual screen and there is no intersection between these subimages. The size of each sub-image is proportional to the size of its cluster. The dashed lines in the left column represent the sizes that regular sub-images would have. They have been drawn for comparison with the irregular ones. Only the 4 central clusters 1113, 1115, 1116 and 1117 have a regular size subimage 1103, 1105, 1106 and 1107.

An embodiment with more lenslets would have more regular clusters in the central part, and usually only two rows of irregular clusters and subimages around the edge of the digital display or the edge of the virtual screen. The number of irregular rows changes with the number of channels.

Figure 12:
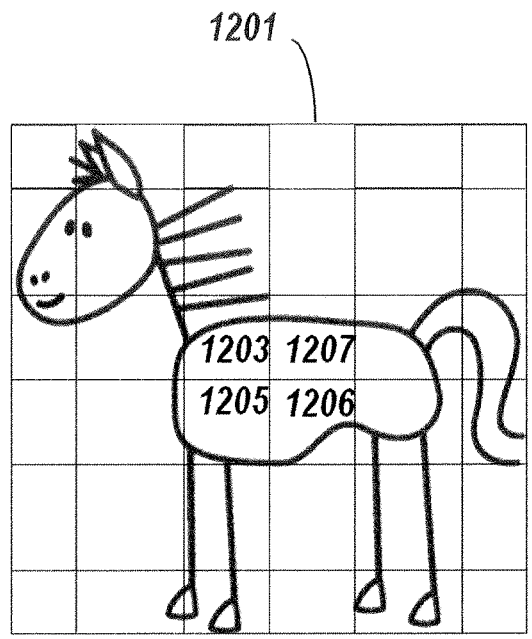
FIG. 12 is a front view of the virtual screen with all sub-images.

FIG. 12 is a front view of the virtual screen with all the sub-images combined. The thin continuous lines represent the boundaries of the sub-images. The 4 regular sub-images have been labeled 1203, 1205, 1206 and 1207.

Figure 13:
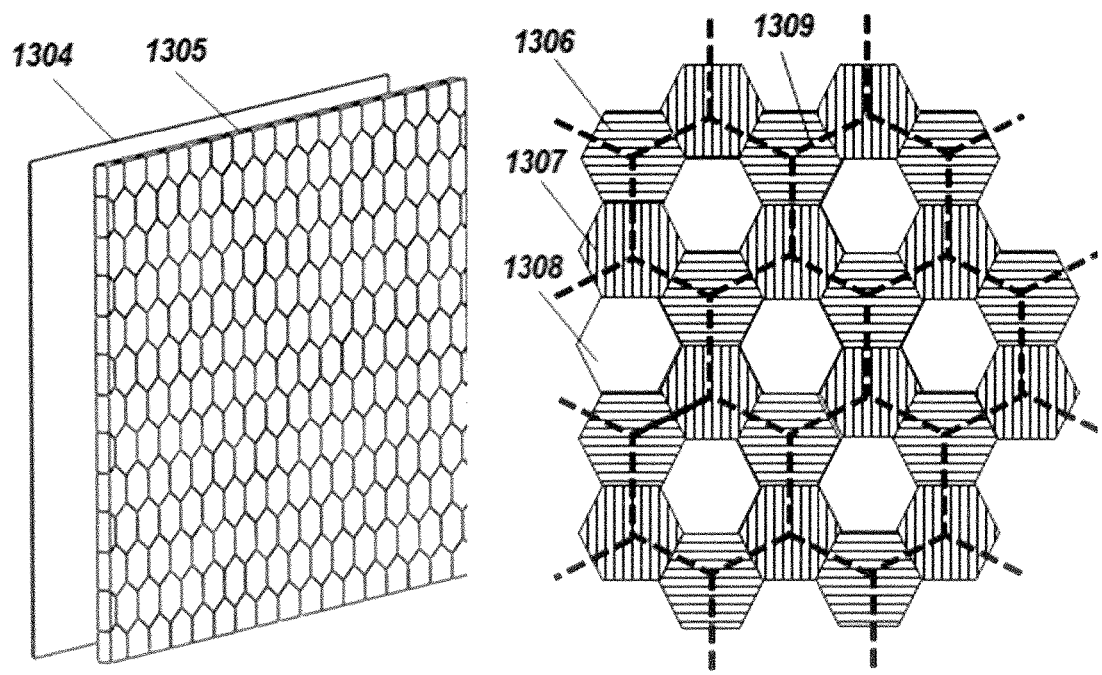
FIG. 13 is a schematic view of a configuration for 3 channels.
Figure 14:
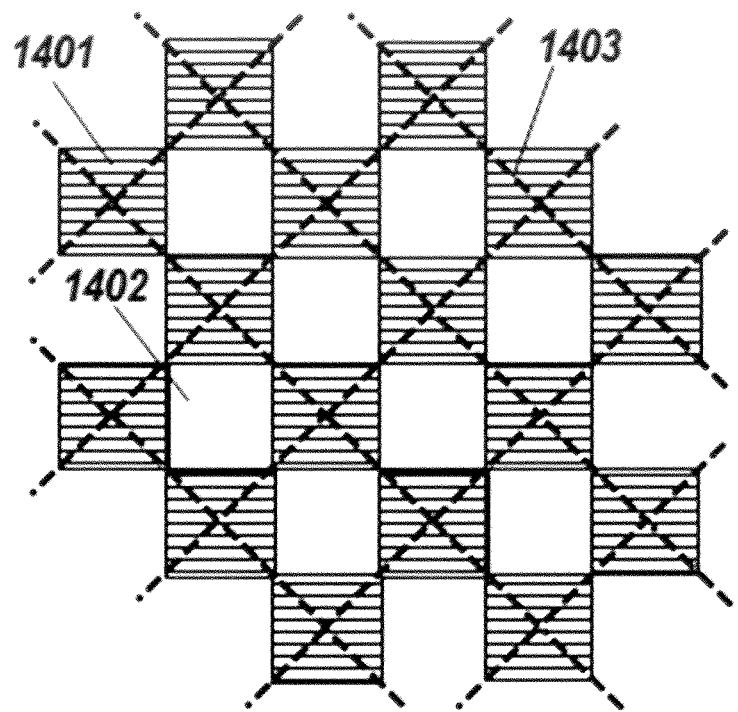
FIG. 14 is a schematic view of a configuration for 2 channels.

The same concepts that we have applied to a 4 channel embodiment can be extended to other number of channels. For instance, FIG. 13 shows an example of 3 channels ($\tau^2=3$). The lenslet array optics 1305, with a hexagonal arrangement, is shown on the left side of FIG. 13. This array is placed in front of the digital display 1304 and a shutter (not shown in FIG. 13). FIG. 13 right shows a front view of the digital display with the cluster arrangement (thick dashed lines) and the contours of the exit apertures of the lenslets (thin continuous lines). The lenslet array is divided into 3 channels: hexagonal lenslets with horizontal strips 1306, hexagonal lenslets with vertical strips 1307 and white hexagonal lenslets 1308. FIG. 13 right shows also the open clusters 1309 corresponding to the lenslet group 1308 (white hexagons). FIG. 14 shows an example with 2 channels ($\tau^2=2$). The lenslets of one channel are rectangles with horizontal strips 1401 and the lenslets of the other channel are white rectangles 1402. FIG. 14 also shows the open clusters 1403 corresponding to the channel 1402 (white rectangles). In a non-TDM embodiment with the same digital display and the same virtual screen as that of FIG. 14, the clusters would have a size similar to the lenslet apertures and the lenslet's focal distance would be a factor $\tau$ (where $\tau^2=\sqrt{2}$ in this embodiment) smaller than that of the TDM embodiment.

Figure 1:
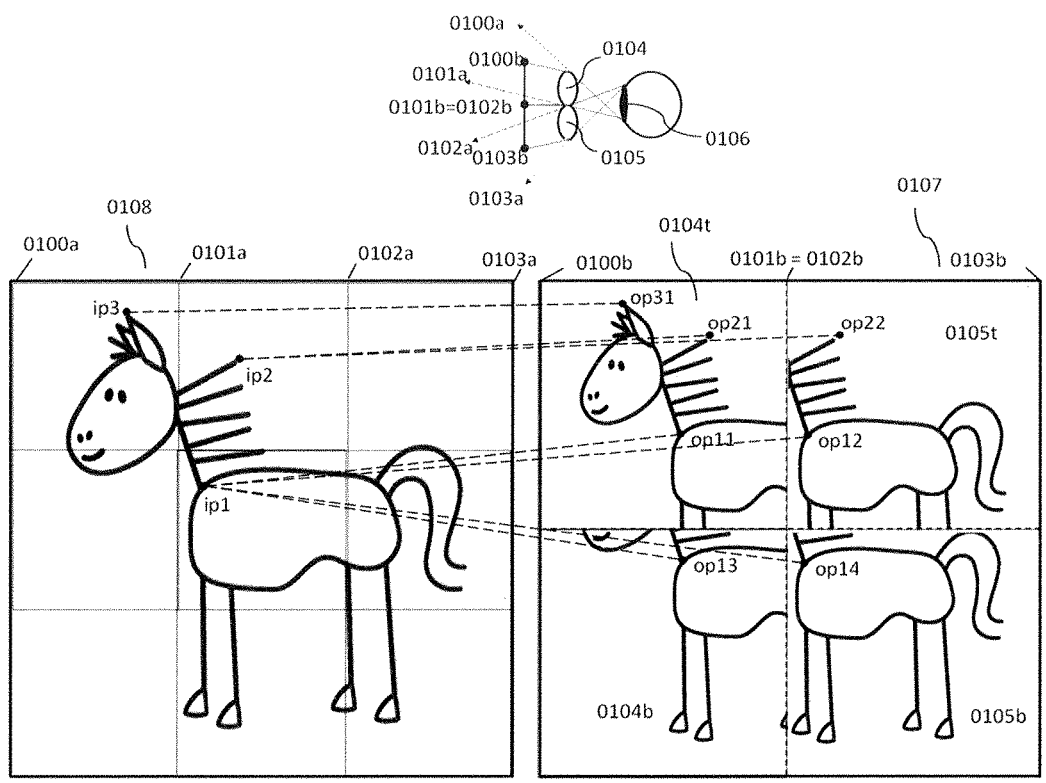
FIG. 1 is a schematic view of ipixels to opixels mapping (prior art).
Figure 2:
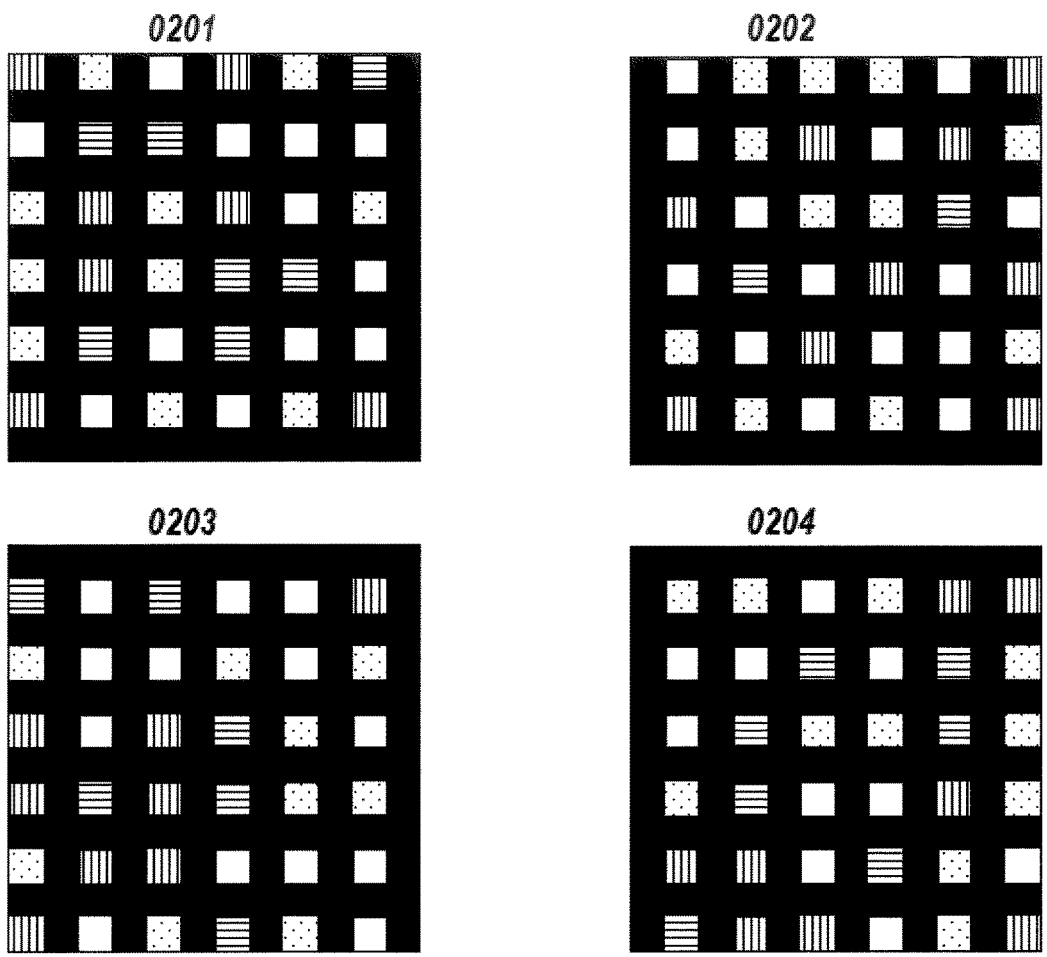
FIG. 2 shows an image decomposed in 4 sub-images (0201, 0202, 0203 and 0204) which are sequentially shown in a (prior art) time division multiplexing scheme.

Ipixel interlacing, a concept introduced and developed in PCT1 (sections 6.2 and 6.9) allows reducing the subimage overlapping redundancy when the lenslet size is smaller than the eye pupil. This interlacing concept consists in grouping the lenslets in sets so that each set projects to the eye an image which is interlaced with the other sets, taking advantage of the fact that the emitting area of a digital display opixel is usually only a fraction of the full opixel area. An example of interlaced images are the four images of FIG. 2, assuming that there is a single ipixel on each one of the non-black squares of the images 0201, 0202, 0203 and 0204. Then, since the images are interlaced they are not redundant. If the number of interlacing sets is $k^2$, where $k^2>1$ is an integer ($k^2=1$ indicates no interlacing is done), then the interlaced systems described in PCT1 have $k^2>1$ and $\tau^2=1$ (i.e., without time-multiplexing). On the other hand, the time-multiplexing schemes disclosed here so far have $k^2=1$ and $\tau^2>1$. However, following the design rules described here and in PCT1, both concepts can be combined with $k^2>1$ and $\tau^2>1$, i.e., using ipixel interlacing and time multiplexing simultaneously, further increasing the field of view, the pupil range, the resolution or any combination of the three. Interlacing sets may coincide with TDM channels although this is not a necessary condition.

Multiplexation in time can also be achieved with a Digital Micromirror Device (DMD) as digital display. In this case, selection of the lenslet section to illuminate can be done with a proper design of the DMD illuminators instead of using shutters. For this alternative, there is an illumination set per channel. This illumination set is only ON when the DMD is showing the part of the image corresponding to the corresponding channel. The illumination set can be realized with LEDs plus an optical condenser illuminating the DMD evenly and with a certain collimation so the DMD pixels are lit by an angularly narrow pencil of rays. The directions of these rays are such that once reflected by the DMD in one of its 2 states, the light reaches only the corresponding channel. This illumination switching scheme can also be applied to an LCOS digital display by a proper design of a directional frontlight unit as the directional backlight unit mentioned before.

The design procedure for all embodiments herein may be carried out using the following steps:

1) Select the number of channels. The selection of this number depends on the switching time of the display, and that of the shutters when used. With devices currently commercially available, in general, the display switching time is more restrictive. The inverse of the maximum frame rate of the display will give the minimum sub-frame slot time. The number of channels times the minimum sub-frame slot time gives the minimum display time for the virtual images. For instance, a display frame rate of 180 fps with 2 channels will give a 90 fps rate for the display of the virtual images.

Figure 15:
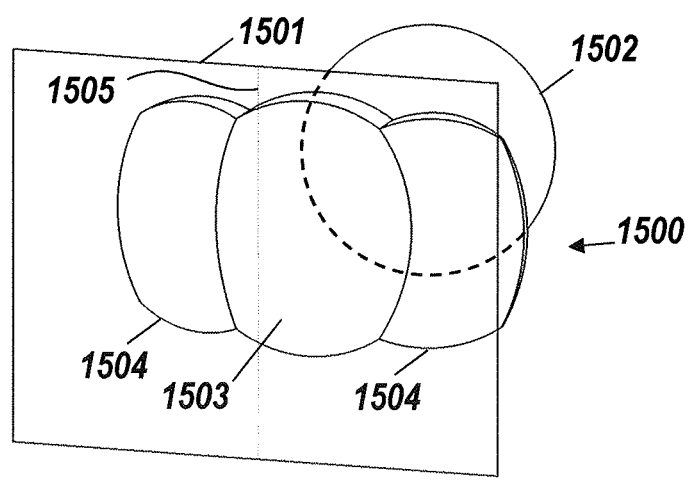
FIG. 15 is an isometric view of a 2-channel 3-lenslet embodiment.

2) Select the sub-image structure. The size and approximate location of the subimages is selected in this step. FIG. 6 gives some examples of 2 subimages. The examples corresponding to FIGS. 9, 10 and 11 are for 4 subimages in square matrix structure. FIG. 13 (dashed lines) shows 3 subimages in a hexagonal matrix structure, and FIG. 14 shows 2 subimages in a square matrix structure. FIG. 15 shows a 2-channel configuration. In this case there is a central channel and a second channel surrounding the central channel. The lens 1500 has a central lenslet 1503 for the first channel. The second channel is formed by 2 lenslets 1504 on either side of the central lenslet 1503. The optical system 1500 is between the eye 1502 and the digital display 1501. The clusters share the digital display among the lenslets of the same channel. The first channel, using the central lenslet 1503, has a single cluster that occupies the full digital display 1501. The second channel, using the outer lenslets 1504, has two clusters, one cluster for each lenslet, that divide the digital display along the dashed line 1505.

Figure 16:
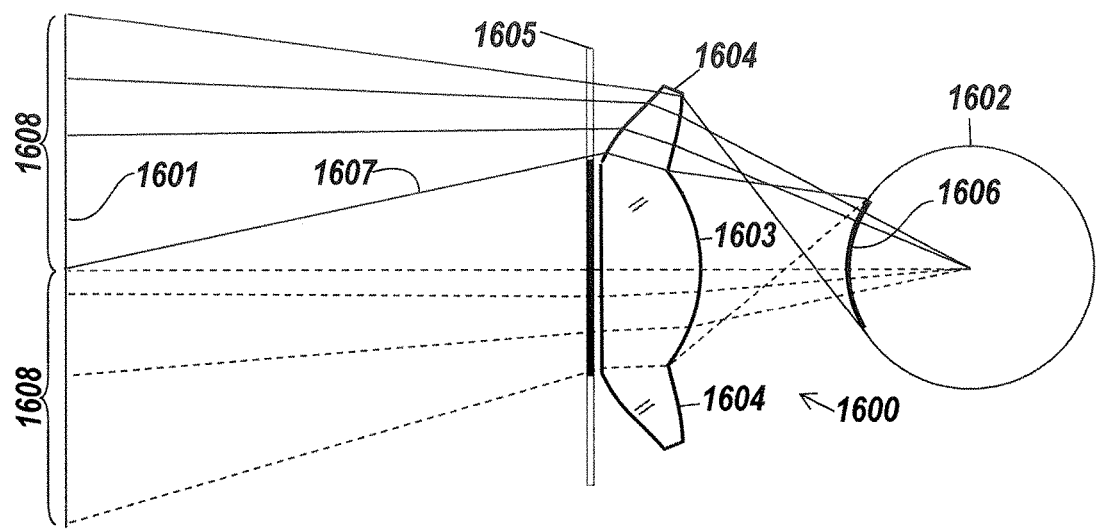
FIG. 16 is a horizontal cross section view of the 2-channel 3-lenslet embodiment of FIG. 15.

FIG. 16 shows a horizontal cross section of a lens 1600 similar to the lens 1500 of FIG. 15. Some exemplary rays in the central channel 1603 are drawn in the bottom half of FIG. 16 with dashed lines. Some exemplary rays in the second channel are drawn with continuous line in the top half of FIG. 16. The figure is symmetric with respect the line linking the center of the eye 1602 center and the center of the digital display 1601. The rays in the top and bottom halves are consequently also symmetric. Because of the aforementioned symmetry, the center of the digital display 1601 separates the 2 clusters of the second channel. Of particular interest is the ray 1607 coming from the center of the digital display 1601 and reaching one edge of the pupil range 1606, which is a necessary design condition to avoid cross talk, as explained in PCT1.

3) Optical design. The optical design may be done according to section 6 of PCT1 (in particular 6.2 to 6.7). The only difference is that the lenslets of the same channel may be spaced apart even if their corresponding clusters of opixels on the real image display are contiguous. This is the case of the 2 isolated lenslets 1604 in FIG. 16 whose 2 clusters 1608 are contiguous.

4) Shutter design. When shutters are used, these have to be placed somewhere along the path of the rays of the channel so that each shutter blocks all the rays in its respective channel, and does not block rays in other channels. In order to maximize alignment and manufacturing tolerances it is advisable to locate the shutters in regions where the ray trajectories of different channels do not overlap, and preferably are not contiguous. A good position is usually in the path between the digital display and the lens, close to the lens, as shown in FIG. 16. In this example the shutters 1605 for all clusters are placed on the same plane. The shutter corresponding to the central channel is shown black. The shutter of the second channel, shown white, is divided in 2 parts corresponding to the 2 isolated lenslets 1604.

Although specific embodiments have been described, the preceding description of presently contemplated modes of practicing the invention is not to be taken in a limiting sense, but is made merely for the purpose of describing certain general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

For example, instead of providing shutters in the optical channels between the display and the lenslets or between the lenslets and the eye, it is possible in some embodiments to put the shutters between the light source and the display, or to switch different partial light sources on and off to produce distinct flows of light.

The full scope of the invention should be determined with reference to the claims, and features of any two or more of the claims may be combined.

We claim:

1. A display device comprising:
a display, operable to generate a real image; and
an optical system, comprising a plurality of optical channels, each of the optical channels comprising one or more lenslets, arranged to generate one or more portions of a virtual image from one or more respective partial real images on the display associated with that channel, by each lenslet projecting light from the display to an eye position;
wherein the portions of the virtual image combine to form a virtual image viewable from the eye position so that different optical channels image a same portion of the display to different portions of the virtual image;
comprising a light switching system allowing a flow of light through selected ones of the channels from the display to a pupil range and preventing a flow of light through other selected ones of the channels from the display to the pupil range;

wherein the light switching system is arranged to successively open the optical channels to allow light to flow successively through the optical channels and, while each of the optical channels is open, the display is arranged to display the one or more respective partial real images associated with that channel; and wherein the display is a digital display comprising object pixels, wherein the object pixels are grouped into clusters of contiguous pixels, each cluster forming a partial real image and associated with a respective lenslet that belongs to one of the optical channels, wherein at least some object pixels belong to more than one cluster at different times, according to which of the respective optical channels is active.

2. The display device of claim 1, wherein at least one of the partial real images occupies substantially a whole active area of the display.

3. The display device of claim 1, wherein at least two of the partial real images occupy non-overlapping portions of the display, and the display is arranged to display those two partial real images, and to open parts of the optical system associated with the union of the displayed partial real images, at the same time as a single optical channel.

4. The display device of claim 1, wherein the light switching system comprises shutters operative to selectively prevent light from flowing through associated ones of the channels.

5. The display device of claim 1, wherein the light switching system is operative to control a direction in which light flows to or from selected portions of the display.

6. The display device of claim 1, wherein each channel is arranged to be open, and the respective one or more partial real images to be displayed, cyclically in a repeating sequence.

7. The display device of claim 1, wherein at least one channel comprises two or more lenslets in parallel that image one spatially continuous portion of the display to one spatially continuous portion of the virtual image.

8. The display device of claim 1, further comprising an image generator operative to receive an input image, to generate partial input images each assigned to a partial real image position on the display so that upon displaying the generated partial input images as said partial real images the corresponding portions of the virtual image align to form an uninterrupted virtual image of the input image, wherein at least some of the partial real image positions overlap and contain partial real images that in those positions would not form part of a single uninterrupted image on the display.

9. The display device of claim 8, wherein:

the image generator is operative to receive input video, and to generate, for each of a succession of images of the input video, partial real images each so positioned on the display that the corresponding portions of the virtual image align to form an uninterrupted virtual image of the input image; and wherein the video is displayed on the display device by displaying the images of the input video in succession, and each of the images of the input video is displayed by displaying the partial real images of that image of the input video in succession.

10. The display device of claim 1, wherein all the optical channels are aligned to direct the light from their respective portions of the virtual image to a pupil range that comprises an area on the surface of an imaginary sphere at the eye position of from 21 to 27 mm diameter, the pupil range including a circle subtending 15 degrees whole angle at the center of the sphere.

11. A display device according to claim 1, the display device including a non-transitory computer readable storage device contained within the display device, the storage device containing computer readable data representing a plurality of partial images of an input image and positions for the partial images, at least some of the positions overlapping, so that when each partial image is successively displayed at its assigned position, and imaged by a respective one of a plurality of channels to its corresponding portion of a virtual image, the portions of the virtual image combine to form an uninterrupted virtual image of the input image.

12. A display device comprising:

a display, operable to generate a real image; and an optical system, comprising a plurality of optical channels, each of the optical channels comprising one or more lenslets, arranged to generate one or more portions of a virtual image from one or more respective partial real images on the display associated with that channel, by each lenslet projecting light from the display to an eye position;

wherein the portions of the virtual image combine to form a virtual image viewable from the eye position so that different optical channels image a same portion of the display to different portions of the virtual image;

comprising a light switching system allowing a flow of light through selected ones of the channels from the display to a pupil range and preventing a flow of light through other selected ones of the channels from the display to the pupil range;

wherein the light switching system is arranged to successively open the optical channels to allow light to flow successively through the optical channels and, while each of the optical channels is open, the display is arranged to display the one or more respective partial real images associated with that channel; and wherein substantially all imaging light rays falling on said pupil range through a given lenslet come from an associated partial real image, and substantially all said imaging light rays falling on said pupil range from the associated partial real image pass through the associated lenslet.

13. The display device of claim 1, wherein substantially all imaging light rays exiting a given lenslet towards the pupil range and virtually coming from any one position of the virtual image are generated from a single position of the associated partial real image.

14. A headgear comprising the display device of claim 1, with a mount for positioning the display device on a human head with the eye position of the display device coinciding with an eye of the human.

15. The headgear of claim 14, further comprising a second display device according to claim 1, mounted with the eye position of the second display device coinciding with a second eye of the human.

16. The headgear of claim 15, wherein said display of said display device and said display of said second display device are parts of a single display.

17. A method of displaying a given image, comprising:

generating a succession of partial real images, each representing part of the given image and together representing the given image, and at least some of the partial real images occupying spatially overlapping positions; and successively imaging the partial real images to form respective portions of the virtual image viewable from an eye position;

wherein the portions of the virtual image combine spatially to form a virtual image viewable from the eye position so that spatially overlapping portions of different partial real images form different portions of the virtual image;

wherein successively imaging comprises successively causing or permitting light to flow through selected ones of a plurality of optical channels from the display to the eye position and preventing a flow of light through other selected ones of the plurality of optical channels from the display to a pupil range at the eye position; and further comprising forming the real image on a digital display comprising object pixels, grouping the object pixels into clusters of contiguous pixels, causing each cluster to form a partial real image associated with a lenslet belonging to one of the optical channels, and grouping at least some object pixels into more than one cluster at different times, according to which of the respective optical channels is active.

18. The method of claim 17, wherein successively imaging the partial real images comprises successively imaging sets of simultaneously displayed partial real images, wherein at least one said set comprises a plurality of non-overlapping partial real images.

19. The method of claim 17, wherein the successively causing or permitting light to flow comprises operating shutters to selectively prevent light from flowing through associated ones of the channels.

20. The method of claim 17, wherein the causing or permitting light to flow comprises controlling a direction in which light flows to or from selected portions of the real image.

21. The method of claim 17, wherein the optical channels comprise lenslets forming the portions of the virtual image from the partial real images.

22. The method of claim 17, wherein the successively imaging comprises permitting light to flow through the channels cyclically in a repeating sequence.

23. The method of claim 17, comprising generating the succession of partial real images on a display, so that at least one of the partial real images occupies substantially a whole active area of the display.

24. The method of claim 17, comprising generating the succession of partial real images on a display, so that at least two of the partial real images occupy non-overlapping portions of the display, and successively imaging comprises imaging said two partial real images at the same time.

25. The method of claim 17, further comprising receiving an input image, defining parts of said input images as partial input images each assigned to a position, and generating said partial input images as said partial real images so positioned that the corresponding portions of the virtual image align to form an uninterrupted virtual image of the input image.

26. The method of claim 25, wherein receiving an input image comprises receiving input video, comprising generating for each of a succession of images of the input video said partial real images each so positioned that the corresponding portions of the virtual image align to form an uninterrupted virtual image of the input image; and displaying the video by displaying the images of the input video in succession, and displaying each of the images of the input video by displaying the partial real images of that image of the input video in succession.

27. The method of claim 17, comprising directing the light from the portions of the virtual image to a pupil range that comprises an area on the surface of an imaginary sphere at the eye position of from 21 to 27 mm diameter, the pupil range including a circle subtending 15 degrees whole angle at the center of the sphere.

28. A method of generating image data for a display device, comprising:

providing a display device according to claim 1, the display device providing the following steps:

receiving an input image;

generating partial images corresponding to parts of the input image; and assigning positions to the partial images, at least some of the positions overlapping;

so that if each partial image is successively displayed at its assigned position, and imaged to a portion of a virtual image by a respective one of a plurality of channels of the display device according to claim 1, the portions of the virtual image combine to form an uninterrupted virtual image of the input image.

* * * * *